US 11,951,777 B2

(12) United States Patent
Tatsuta et al.

(10) Patent No.: US 11,951,777 B2
(45) Date of Patent: Apr. 9, 2024

(54) TIRE

(71) Applicant: Sumitomo Rubber Industries, Ltd., Kobe (JP)

(72) Inventors: Masahiro Tatsuta, Kobe (JP); Junya Tamai, Kobe (JP); Tomohiko Hiroshige, Kobe (JP); Hiroki Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/125,734

(22) Filed: Mar. 24, 2023

(65) Prior Publication Data

US 2023/0311587 A1  Oct. 5, 2023

(30) Foreign Application Priority Data

Mar. 30, 2022 (JP) ................. 2022-054988

(51) Int. Cl.
  *B60C 5/14*      (2006.01)
  *B60C 15/06*     (2006.01)

(52) U.S. Cl.
  CPC ...... *B60C 15/0603* (2013.01); *B60C 15/0628* (2013.01); *B60C 2015/061* (2013.01); *B60C 2015/0682* (2013.01)

(58) Field of Classification Search
  CPC .................. B60C 5/14; B60C 2005/145
  See application file for complete search history.

(56) References Cited

U.S. PATENT DOCUMENTS

| 5,318,089 A   | * | 6/1994  | Tagashira ............. B60C 15/024 |
|               |   |         |  152/544 |
| 6,488,065 B1  | * | 12/2002 | Sato ..................... B60C 9/0042 |
|               |   |         |  152/527 |
| 2012/0125512 A1 | * | 5/2012 | Pottier ................. D07B 1/0633 |
|               |   |         |  57/217 |
| 2019/0248184 A1 | * | 8/2019 | Guillaumain ............ D02G 3/26 |

FOREIGN PATENT DOCUMENTS

| EP | 931676       | * | 7/1999 |
| EP | 3184325      | * | 6/2017 |
| JP | 2002-178714  | * | 6/2002 |
| JP | 2005-179878  | * | 7/2005 |
| JP | 2012-158156 A |  | 8/2012 |
| WO | WO 2020/128291 | * | 6/2020 |

* cited by examiner

*Primary Examiner* — Justin R Fischer
(74) *Attorney, Agent, or Firm* — XSENSUS LLP

(57) ABSTRACT

A tire can include a pair of beads, a carcass, an inner liner, and an insulation located between the carcass and the inner liner. The carcass can include one carcass ply. The carcass ply can include a plurality of carcass cords and a topping rubber. Each carcass cord can have a total fineness of not less than 6000 dtex and not greater than 9000 dtex. The insulation can be located between first and second beads. A ratio (ta/td) of a thickness to of the topping rubber located between the insulation and the carcass cords to a thickness td of the insulation can be not less than 0.2 and not greater than 0.6.

12 Claims, 9 Drawing Sheets

TIRE

CROSS REFERENCE TO RELATED APPLICATION(S)

The present application claims priority to Japanese patent application JP 2022-054988, filed on Mar. 30, 2022, the entire contents of which is incorporated herein by reference in its entirety.

BACKGROUND

Technical Field

The present disclosure relates to a tire. Specifically, the present disclosure relates to a tire that can be mounted to a passenger car.

Background Art

A carcass of a tire includes at least one carcass ply. The carcass ply may include a relatively large number of carcass cords. As each carcass cord, a cord having a cord structure of 1100 dtex/2 or 1670 dtex/2 may be normally used. An inner liner which forms a tire inner surface may be located inward of the carcass.

In a vulcanization step for the tire, an unvulcanized tire (hereinafter, referred to as green tire) can be pressed against a mold by a bladder located inside the unvulcanized tire. At this time, the inner liner may flow into the space between the carcass cords. In this case, thread-like irregularities (also called open thread) can occur on the tire inner surface.

The open thread can influence at least the appearance quality of the tire. Various studies have been conducted in order to prevent occurrence of open thread (for example, Japanese Laid-Open Patent Publication No. 2012-158156).

In order to meet the demand for mass reduction, forming a carcass, which may have previously been composed of two carcass plies, by a single carcass ply is considered.

If the number of carcass plies that form a carcass is reduced, the strength of the carcass may decrease. In order to achieve mass reduction of a tire while suppressing a decrease in strength, the use of a cord thicker than those used so far, specifically, a large-diameter cord having a total fineness of 6000 to 9000 dtex, for instance, as each carcass cord, is considered.

In the vulcanization step, the interval between the carcass cords tends to widen at a boundary portion (hereinafter, referred to as "buttress portion") between a tread portion and each side portion.

In a carcass composed of only one carcass ply, carcass plies do not hold each other as in a carcass composed of two carcass plies, for instance. The interval between the carcass cords at the buttress portion may tend to widen such that there is a concern that open thread may occur at the buttress portion.

SUMMARY

A tire according to an aspect of the present disclosure can include: a tread configured to come into contact with a road surface; a pair of sidewalls each connected to an end of the tread and located radially inward of the tread; a pair of beads each located radially inward of the sidewall; a carcass located inward of the tread and the pair of sidewalls and extending on and between a first bead and a second bead out of the pair of beads; a belt located between the tread and the carcass in a radial direction; an inner liner located inward of the carcass; and an insulation located between the carcass and the inner liner. Each of the beads can include a core and an apex located radially outward of the core. The carcass can include only one carcass ply. The carcass ply can include a ply body extending between the core of the first bead and the core of the second bead, and a pair of turned-up portions connected to the ply body and turned up at the cores. The carcass ply can include a plurality of carcass cords aligned with each other and a topping rubber covering the carcass cords. Each of the carcass cords can have a total fineness of not less than 6000 dtex and not greater than 9000 dtex. The insulation can be located between the first bead and the second bead. A ratio of a thickness of a portion of the topping rubber located between the insulation and the carcass cords to a thickness of the insulation can be not less than 0.2 and not greater than 0.6.

DETAILED DESCRIPTION

Figure 1:
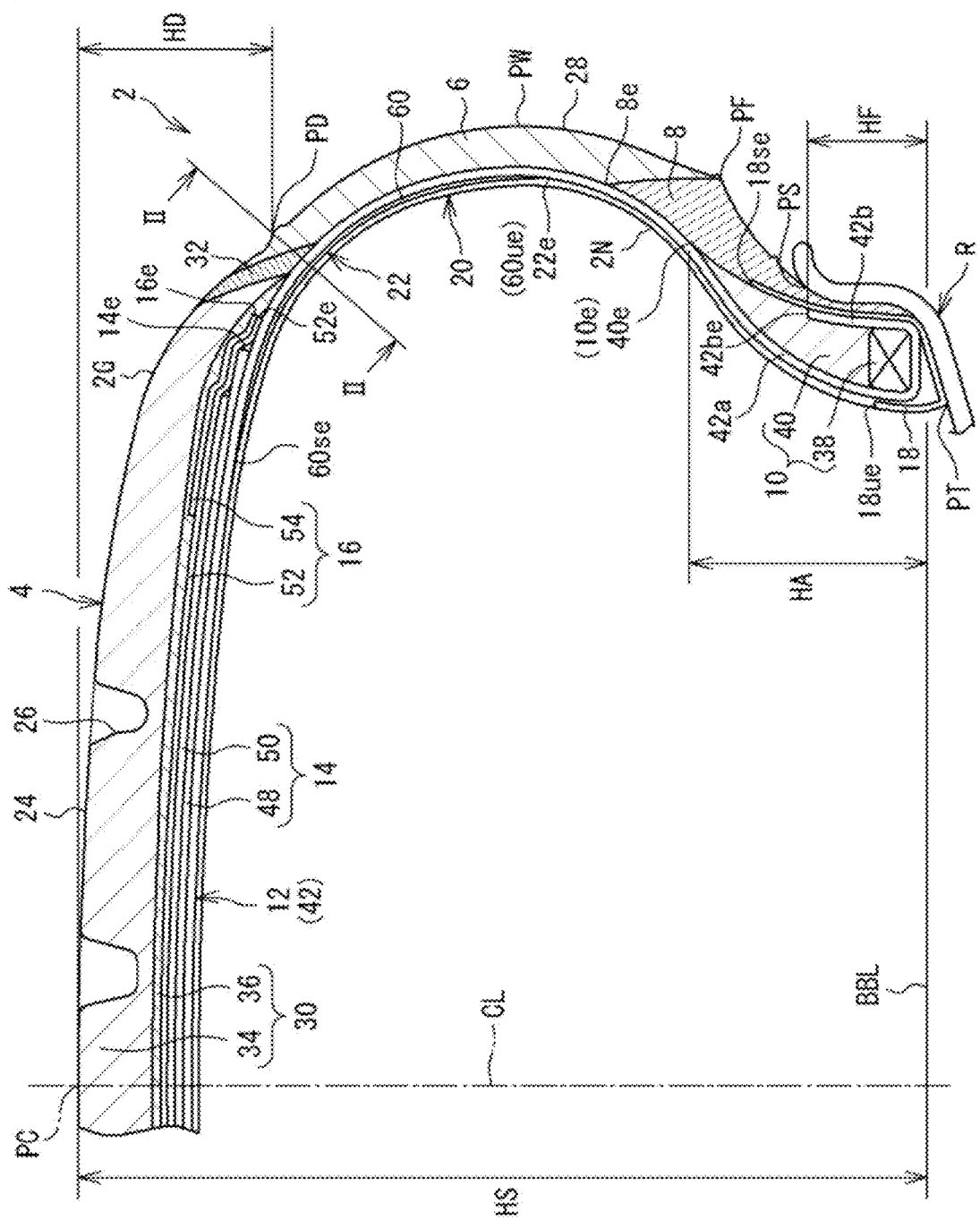
FIG. 1 is a cross-sectional view showing a part of a tire according to a first embodiment of the present disclosure.

Hereinafter, the present disclosure will be described in detail based on preferred embodiments with appropriate reference to the drawings.

In order to achieve mass reduction while suppressing a decrease in the strength of a carcass, establishment of a technology capable of suppressing occurrence of open thread can be required. The present disclosure has been made in view of at least the circumstances described above in the Background section. An object of the present disclosure, among one or more objects, can be to provide a tire that can achieve mass reduction while suppressing a decrease in the strength of a carcass without impairing appearance quality.

A tire can be fitted on a rim. The interior of the tire can be filled with air to adjust the internal pressure of the tire. In the present disclosure, the tire fitted on the rim can be regarded as a tire-rim assembly. The tire-rim assembly can include the rim and the tire fitted on the rim.

In the present disclosure, a state where a tire is fitted on a standardized rim, the internal pressure of the tire is adjusted to a standardized internal pressure, and no load is applied to the tire can be regarded as a standardized state.

In the present disclosure, unless otherwise specified, the dimensions and angles of each component of the tire are measured in the standardized state.

The dimensions and angles of each component in a meridian cross-section of the tire, which cannot be measured in a state where the tire is fitted on the standardized rim, are measured in a cross-section (hereinafter, referred to as reference cut plane) of the tire obtained by cutting the tire along a plane including a rotation axis. In this measurement, the distance between right and left beads can be set so as to be equal to the distance between the beads in the tire that is fitted on the standardized rim.

The standardized rim can be regarded as a rim specified in a standard on which the tire is based. The "standard rim" in the JATMA standard, the "Design Rim" in the TRA standard, and the "Measuring Rim" in the ETRTO standard are examples of standardized rims.

The standardized internal pressure can be regarded as an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are examples of standardized internal pressures.

The standardized load can be regarded as a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are examples of standardized loads.

In the present disclosure, a rubber composition can be regarded as a composition that is obtained by mixing a base rubber and chemicals in a kneading machine such as a Banbury mixer and that contains the uncrosslinked base rubber. A crosslinked rubber can be regarded as a crosslinked product, of the rubber composition, obtained by pressurizing and heating the rubber composition. The crosslinked rubber can contain a crosslinked product of the base rubber. The crosslinked rubber can also be referred to as vulcanized rubber, and the rubber composition can also be referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Selection of a base rubber and chemicals, the amounts of the selected chemicals, etc., can be determined as appropriate according to the specifications of components, such as a tread and a sidewall, for which the rubber composition is used.

In the present disclosure, a complex elastic modulus of a component formed from a crosslinked rubber, of the components included in the tire, can be measured using a viscoelasticity spectrometer ("VES" manufactured by Iwamoto Seisakusho) under the following conditions according to the standards of JIS K6394. The complex elastic modulus in the present disclosure can be a complex elastic modulus at 70° C.

Initial strain=10%
Dynamic strain=2%
Frequency=10 Hz
Deformation mode=tension
Temperature=70° C.

In this measurement, a test piece can be sampled from the tire. When a test piece cannot be sampled from the tire, a test piece can be sampled from a sheet-shaped crosslinked rubber (hereinafter, also referred to as rubber sheet) obtained by pressurizing and heating a rubber composition, which can be used for forming the component to be measured, at a temperature of 170° C. for 12 minutes.

According to one or more embodiments of the present disclosure, the configuration (cord structure) of a cord formed from an organic fiber can be represented in accordance with "5.2 Indication method of cord structure" of JIS L1017. In the case where a cord is formed, for example, by twisting two single yarns (filaments) each having a fineness of 1400 dtex, the cord structure of the cord can be represented by 1400 dtex/2. The total fineness (dtex) of the cord can be represented by the product (1400×2=2800) of the fineness of the single yarn (1400 dtex) and the number of single yarns (2).

In the present disclosure, a tread portion of the tire can be regarded as a portion of the tire that comes into contact with a road surface. A bead portion can be regarded as a portion of the tire that is fitted to a rim. A side portion can be regarded as a portion of the tire that extends between the tread portion and the bead portion. The tire, according to one or more embodiments of the present disclosure, can include a tread portion, a pair of bead portions, and a pair of side portions as portions thereof. A boundary portion between the tread portion and each side portion may also be referred to as buttress portion.

First Embodiment

FIG. 1 shows a part of a tire 2 according to a first embodiment of the present disclosure. The tire 2 can be a pneumatic tire for a passenger car.

FIG. 1 shows a part of a cross-section (hereinafter, referred to as meridian cross-section) of the tire 2 taken along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line CL represents the equator plane of the tire 2.

In FIG. 1, the tire 2 is fitted on a rim R (e.g., standardized rim). The interior of the tire 2 can be filled with air to adjust or set the internal pressure of the tire 2.

In FIG. 1, a solid line BBL extending in the axial direction is a bead base line. The bead base line BBL can be regarded as a line that defines the rim diameter (see JATMA or the like) of the rim R.

In FIG. 1, a position indicated by reference character PC is the point of intersection of the outer surface of the tire 2 and the equator plane CL. The point of intersection PC can be regarded as the equator of the tire 2. In the case where a groove is located on the equator plane CL, the equator PC is specified based on a virtual outer surface obtained on the assumption that no groove is provided thereon. The equator PC can also be regarded as a radially outer end of the tire 2.

In FIG. 1, a length indicated by reference character HS is the cross-sectional height (see JATMA or the like) of the tire 2. The cross-sectional height HS (also referred to as tire cross-sectional height HS) can be regarded as the distance in the radial direction from the bead base line BBL to the equator PC.

In FIG. 1, a position indicated by reference character PW is an axially outer end (hereinafter, referred to as outer end PW) of the tire 2. In the case where decorations such as patterns and letters are present on the outer surface of the tire 2, the outer end PW can be specified based on a virtual outer surface obtained on the assumption that the decorations are not present thereon.

The distance in the axial direction, from a first outer end PW to a second outer end PW, obtained in the standardized state, can be regarded as the cross-sectional width (see JATMA or the like) of the tire 2. The outer end PW may also be referred to as maximum width position.

In FIG. 1, a position indicated by reference character PT can be regarded as a toe of the tire 2. The toe PT can be regarded as the boundary between the outer surface (hereinafter, referred to as tire outer surface 2G) and the inner surface (hereinafter, referred to as tire inner surface 2N) of the tire 2.

In FIG. 1, reference character PD can indicate a position on the tire outer surface 2G. A length indicated by reference character HD can be regarded as the distance in the radial direction from the equator PC to the position PD. In the tire 2, the distance HD in the radial direction can be 0.23 times the tire cross-sectional height HS, for instance. The position indicated by reference character PD can be the position at which the distance HD in the radial direction from the equator PC is 0.23 times the tire cross-sectional height HS.

Generally a tire can be obtained by pressurizing and heating a green tire in a mold. In the case where the mold is a segmented mold, the mold can include a tread ring for shaping a tread portion, a pair of side plates each for shaping a side portion, and a pair of bead rings each for shaping a bead portion. The tread ring can be composed of a plurality of segments aligned in the circumferential direction.

The above-described position PD is the position, on the tire outer surface 2G, corresponding to the position of the boundary between a segment and a side plate on a cavity surface of a mold for the tire 2.

In the present disclosure, the position PD can also be referred to as buttress boundary-corresponding position.

Figure 2:
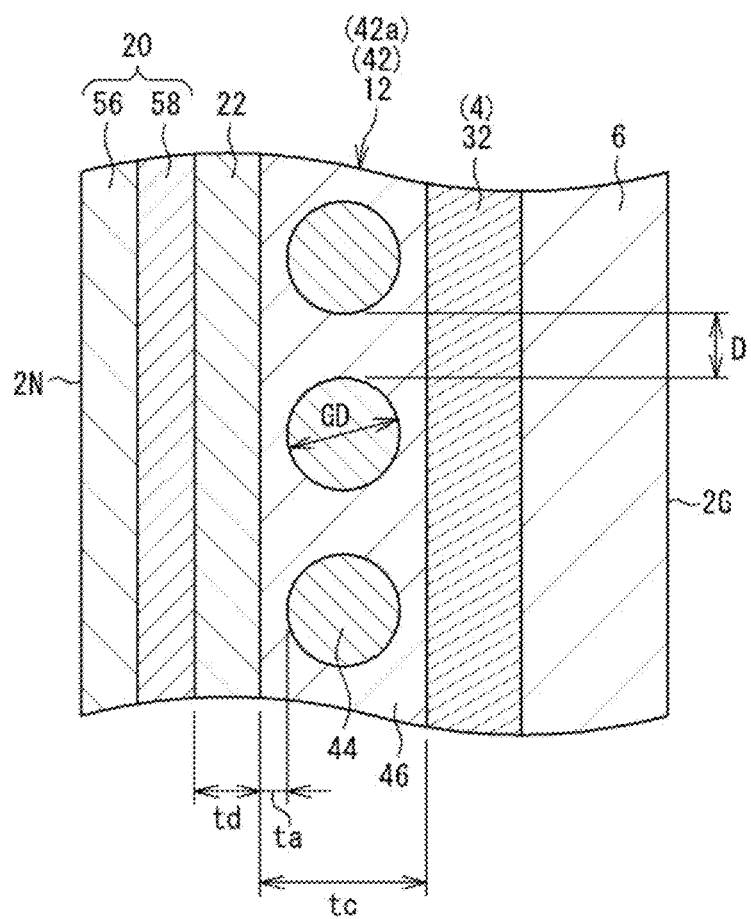
FIG. 2 is a cross-sectional view taken along a line II-II in FIG. 1.

FIG. 2 shows a cross-section of the tire 2 (specifically, side portion) taken along a line II-II in FIG. 1. In the surface of the drawing sheet of FIG. 2, the right side is the tire outer surface 2G side, and the left side is the tire inner surface 2N side.

In FIG. 1, the line II-II is a normal line that passes through the buttress boundary-corresponding position PD and is normal to the tire inner surface 2N. FIG. 2 shows a cross-section of the side portion around the buttress boundary-corresponding position PD.

The tire 2 can include a tread 4, a pair of sidewalls 6, a pair of clinches 8, a pair of beads 10, a carcass 12, a belt 14, a band 16, a pair of chafers 18, an inner liner 20, and an insulation 22.

The tread 4 can come into contact with a road surface at a tread surface 24 thereof. The tread 4 can have the tread surface 24 which can come into contact with a road surface. Grooves 26 can be formed on the tread 4.

The tread surface 24 can be a part of the tire outer surface 2G. Side surfaces 28 can be connected to the tread surface 24. The tire outer surface 2G can include the tread surface 24 and a pair of the side surfaces 28.

The tread 4 can include a tread body 30 and a pair of wings 32.

Each wing 32 can be located axially outward of the tread body 30. The wing 32 can join the tread body 30 and the sidewall 6. The wing 32 can be formed from a crosslinked rubber for which adhesiveness is taken into consideration.

The tread body 30 can include a cap portion 34 and a base portion 36. The cap portion 34 can include the tread surface 24. The cap portion 34 can come into contact with a road surface. The cap portion 34 can be formed from a crosslinked rubber for which wear resistance and grip performance are taken into consideration. The base portion 36 can be located radially inward of the cap portion 34. The entirety of the base portion 36 can be covered with the cap portion 34. The base portion 36 can be formed from a crosslinked rubber that has relatively low heat generation properties.

Each sidewall 6 can be connected to an end of the tread 4. The sidewall 6 can be located radially inward of the tread 4. The sidewall 6 can be formed from a crosslinked rubber for which cut resistance is taken into consideration.

Each clinch 8 can be located radially inward of the sidewall 6. An outer end 8e of the clinch 8 can be located radially inward of the maximum width position PW. The clinch 8 can come into contact with the rim R. The clinch 8 can be formed from a crosslinked rubber for which wear resistance is taken into consideration.

In FIG. 1, a position indicated by reference character PS is the position, on the tire outer surface 2G, corresponding to the radially outer end of a contact surface between the tire 2 and the rim R. The position PS can also be referred to as contact surface outer end position.

Each bead 10 can be located axially inward of the clinch 8. The bead 10 can be located radially inward of the sidewall 6.

The bead 10 can include a core 38 and an apex 40. The core 38 can extend in the circumferential direction. The core 38 can include a steel wire. The apex 40 can be located radially outward of the core 38. The apex 40 can be tapered radially outward. The apex 40 can be formed from a crosslinked rubber that has high stiffness. The length of the apex 40 can be not less than 25 mm and not greater than 45 mm, for instance. The length of the apex 40 can be regarded as the length of a line segment connecting the center in the width direction of the bottom surface and an outer end 40e of the apex 40.

The outer end 40e of the apex 40 can be located radially inward of the maximum width position PW. The outer end 40e of the apex 40 can be an outer end 10e of the bead 10. The entirety of the bead 10 can be located radially inward of the maximum width position PW.

In FIG. 1, a length indicated by reference character HA can be regarded as the distance in the radial direction from the bead base line BBL to the outer end 40e of the apex 40.

In the tire 2, the ratio (HA/HS) of the distance HA in the radial direction to the tire cross-sectional height HS may be not less than 0.20 and not greater than 0.30, for example.

The carcass 12 can be located inward of the tread 4, the pair of sidewalls 6, and the pair of clinches 8. The carcass 12 can extend on and between a first bead 10 and a second bead 10 out of the pair of beads 10.

The carcass 12 of the tire 2 can be composed of one carcass ply 42. That is, the carcass 12 can have only one carcass ply 42. The carcass 12 can contribute to mass reduction of the tire 2.

The carcass ply 42 can include a ply body 42a and a pair of first turned-up portions 42b. The ply body 42a can extend between the core 38 of the first bead 10 and the core 38 of the second bead 10. The respective turned-up portions 42b can be connected to the ply body 42a and turned up from the inner side toward the outer side in the axial direction at the respective cores 38.

In FIG. 1, a length indicated by reference character HF can be regarded as the distance in the radial direction from the bead base line BBL to an end 42be of the turned-up portion 42b. The distance HF in the radial direction may also be referred to as turned-up portion height.

In the tire 2, the ratio (HF/HS) of the turned-up portion height HF to the tire cross-sectional height HS may be not less than 0.10 and not greater than 0.20, for instance.

As shown in FIG. 2, the carcass ply 42 can include a plurality of carcass cords 44, for instance, aligned with each other. These carcass cords 44 can be covered with a topping rubber 46. The carcass ply 42 can include the plurality of carcass cords 44 and the topping rubber 46.

Each carcass cord 44 of the tire 2 can be a cord formed from an organic fiber (hereinafter, referred to as organic fiber cord). The carcass cord 44 can be formed by twisting together a plurality of filaments formed from the organic fiber. Examples of the organic fiber include nylon fibers, rayon fibers, polyester fibers, and aramid fibers. Examples of polyester fibers include polyethylene terephthalate fibers and polyethylene naphthalate fibers. In the tire 2, polyethylene terephthalate fibers are preferable as the organic fiber.

In FIG. 2, a length indicated by reference character GD can be regarded as the outer diameter of the carcass cord 44. In the tire 2, the outer diameter GD of the carcass cord 44 can be controlled by a total fineness described later. The outer diameter GD can be not less than 0.85 mm and not greater than 1.05 mm, as an example range. According to one or more embodiments of the present disclosure, the outer diameter GD can be represented by a "cord gauge" specified in JIS L1017.

The carcass cord 44 can intersect the equator plane CL. An angle of the carcass cord 44 with respect to the equator plane CL, that is, an intersection angle thereof, can be not less than 70° and not greater than 90°, for instance. The carcass 12 of the tire 2 can have a radial structure. At the side portion, the carcass cord 44 can extend substantially in the radial direction (including exactly in the radial direction).

The carcass ply 42 can be formed using a ply material. The ply material can be obtained by covering both surfaces of a cord fabric-like fabric, which can be woven with the carcass cords 44 as warps and wefts interlaced with the warps, with the topping rubber 46. In the ply material, each carcass cord 44 can be placed such that the center of a cross-section thereof is located at the center in the thickness direction of the ply material.

In FIG. 2, a length indicated by reference character tc can be regarded as the thickness of the carcass ply 42. The thickness tc of the carcass ply 42 can be set in consideration of the influence on the strength of the carcass 12 and mass. In the tire 2, the thickness tc of the carcass ply 42 can be not less than 1.1 mm and not greater than 1.4 mm, for instance.

In the present disclosure, an outer portion of the carcass 12 can be regarded as a portion from the outer surface of the carcass 12 to the tire outer surface 2G. The thickness of the outer portion of the carcass 12 can be represented as the distance from the outer surface of the carcass 12 to the tire outer surface 2G. This distance can be measured along a normal line that is normal to the outer surface of the carcass 12. Specifically, in the tire 2, this distance can be measured along a normal line that is normal to the ply body 42a.

In FIG. 1, a position indicated by reference character PF can be regarded as a position, on the radially inner side with respect to the maximum width position PW, at which the outer portion of the carcass 12 has a maximum thickness. In the present disclosure, the position PF can be regarded as a reference position.

In the tire 2, the reference position PF can be located between the maximum width position PW and the rim R in the radial direction.

The belt 14 can be located radially inward of the tread 4. The belt 14 can be stacked on the carcass 12. The belt 14 can be located between the tread 4 and the carcass 12 in the radial direction. The above-described equator plane CL can intersect the belt 14 at the center of the width in the axial direction of the belt 14.

In the tire 2, the width in the axial direction of the belt 14 can be not less than 70% and not greater than 85% of the cross-sectional width of the tire 2, for instance.

The belt 14 can include a first layer 48 and a second layer 50. The first layer 48 can be located radially outward of the ply body 42a and can be stacked on the ply body 42a. The second layer 50 can be located radially outward of the first layer 48 and can be stacked on the first layer 48.

As shown in FIG. 1, an end of the second layer 50 can be located axially inward of an end of the first layer 48. The second layer 50 can be narrower than the first layer 48. The length from the end of the second layer 50 to the end of the first layer 48 may be not less than 3 mm and not greater than 10 mm, for example. The above-described width in the axial direction of the belt 14 can be represented as the width in the axial direction of the wider first layer 48.

Each of the first layer 48 and the second layer 50 can include a relatively large number of belt cords, for instance, aligned with each other. These belt cords can be covered with a topping rubber. Each belt cord can be tilted relative to the equator plane CL. The material of the belt cord can be steel.

The band 16 can be located between the tread 4 and the belt 14 in the radial direction. The band 16 can be stacked on the belt 14.

An end 16e of the band 16 can be located axially outward of an end 14e of the belt 14. The length from the end 14e of the belt 14 to the end 16e of the band 16 may be not less than 3 mm and not greater than 7 mm, for instance.

The band 16 can include a helically wound band cord. The band cord can be covered with a topping rubber. The band cord can extend substantially in the circumferential direction (including exactly in the circumferential direction). For instance, an angle of the band cord with respect to the circumferential direction can be not greater than 5°. The band 16 can have a jointless structure according to one or more embodiments of the present disclosure.

The band cord can have an organic fiber cord. Examples of the organic fiber include nylon fibers, rayon fibers, polyester fibers, and aramid fibers.

The band 16 can include a full band 52 and a pair of edge bands 54.

The full band 52 can be stacked on the belt 14. The full band 52 can cover the entirety of the belt 14. Each end 52e of the full band 52 can be located axially outward of the end 14e of the belt 14.

The pair of edge bands 54 can be arranged so as to be spaced apart from each other in the axial direction with the equator plane CL therebetween. Each edge band 54 can be stacked on the full band 52. The edge band 54 can cover a portion at the end 52e of the full band 52.

From the viewpoint of mass reduction, the band 16 may be composed of only the full band 52. According to one or more embodiments, the band 16 may consist of only the full band 52. Alternatively, the band 16 may be composed of only the pair of edge bands 54. According to one or more embodiments, the band 16 may consist of only the pair of edge bands 54. Alternatively, the band 16 may be composed of only one full band 52 and only one pair of edge bands 54.

Each chafer 18 can located radially inward of the bead 10. The chafer 18 can come into contact with the rim R. In the tire 2, the chafer 18 can include a fabric and a rubber with which the fabric is impregnated.

As shown in FIG. 1, an inner end 18*ue* of the chafer 18 can form a part of the tire inner surface 2N. An outer end 18*se* of the chafer 18 can be located radially outward of the inner end 18*ue*. The outer end 18*se* of the chafer 18 can be located between the bead 10 and the clinch 8.

The inner liner 20 can be located inward of the carcass 12. The inner liner 20 can maintain the internal pressure of the tire 2.

As shown in FIG. 2, the inner liner 20 can be composed of two layers including an inner layer 56 and an outer layer 58. Out of the two layers, the inner layer 56 can form the tire inner surface 2N. The outer layer 58 can be stacked outward of the inner layer 56. The outer layer 58 can be located between the inner layer 56 and the carcass 12.

The thickness of the inner layer 56 may be not less than 0.3 mm and not greater than 0.8 mm, for instance. The thickness of the outer layer 58 may be not less than 0.3 mm and not greater than 0.8 mm, for instance.

The inner layer 56 can be a crosslinked product of a rubber composition. The rubber composition for the inner layer 56 (hereinafter, referred to as first rubber composition) can contain a butyl-based rubber as a base rubber. The main component of the base rubber of the first rubber composition can be the butyl-based rubber. The inner layer 56 can be formed from a crosslinked rubber that has a suitable (e.g., excellent) air blocking property.

Examples of the butyl-based rubber can include isobutylene-isoprene-rubber and halogenated isobutylene-isoprene-rubber. Examples of halogenated isobutylene-isoprene-rubber can include chloro-butyl rubber and bromo-butyl rubber.

In the present disclosure, the fact that the main component of the base rubber can be the butyl-based rubber can mean that the amount of the butyl-based rubber contained in the base rubber can be not less than 50% by mass of the total amount of the base rubber.

From the viewpoint of forming the inner layer 56 having a suitable (e.g., good) air blocking property, the amount of the butyl-based rubber contained in the base rubber can be not less than 70% by mass, for instance, not less than 90% by mass, such as not less than 95% by mass of the total amount of the base rubber. Optionally, the base rubber can consist of the butyl-based rubber.

In the tire 2, a rubber composition that is generally used for the inner layer 56 of the inner liner 20 can be used as the first rubber composition.

The outer layer 58 can be a crosslinked product of a rubber composition. The rubber composition for the outer layer 58 (hereinafter, referred to as second rubber composition) can contain natural rubber as a base rubber. The main component of the base rubber of the second rubber composition can be the natural rubber. The second rubber composition can be a rubber composition for which adhesiveness to the carcass 12, the insulation 22, and the inner layer 56 is taken into consideration. In the tire 2, the inner layer 56 can be attached to the carcass 12 and the insulation 22 via the outer layer 58. The base rubber of the second rubber composition may not contain any butyl-based rubber, according to one or more embodiments of the present disclosure.

In the present disclosure, the fact that the main component of the base rubber can be the natural rubber can mean that the amount of the natural rubber contained in the base rubber may be not less than 50% by mass of the total amount of the base rubber.

From the viewpoint of forming the outer layer 58 having suitable (e.g., good) adhesiveness, the amount of the natural rubber contained in the base rubber can be not less than 70% by mass, for instance, not less than 90% by mass, such as not less than 95% by mass of the total amount of the base rubber.

In the tire 2, a rubber composition that is generally used for the outer layer 58 of the inner liner 20 can be used as the second rubber composition.

In the tire 2, a complex elastic modulus $E^*t$ of the outer layer 58 can be not less than 3.0 MPa and not greater than 5.0 MPa, as an example.

According to one or more embodiments of the present disclosure, the insulation 22 can be located between the carcass 12 and the inner liner 20.

An end 22*e* of the insulation 22 can be located radially inward of the maximum width position PW. The position of the end 22*e* of the insulation 22 may coincide with the maximum width position PW in the radial direction. The end 22*e* of the insulation 22 may be located radially outward of the maximum width position PW.

The insulation 22 can be located between the carcass 12 and the inner liner 20 and can be located between the first bead 10 and the second bead 10.

As described above, the carcass ply 42 of the tire 2 can include the plurality of carcass cords 44 aligned with each other. As shown in FIG. 2, the plurality of carcass cords 44 can be arranged so as to be spaced apart from each other.

Around the buttress boundary-corresponding position PD, the insulation 22 can be stacked on the outer layer 58 of the inner liner 20. The carcass ply 42 can be stacked on the insulation 22. The insulation 22 and the topping rubber 46, which can cover the carcass cords 44, can be located between the outer layer 58 and the carcass cords 44.

In FIG. 2, a length indicated by reference character td can be regarded as the thickness of the insulation 22. A length indicated by reference character ta can be the thickness of the topping rubber 46 located between the insulation 22 and the carcass cords 44.

The thickness td of the insulation 22 and the thickness ta of the topping rubber 46 can be measured along a normal line that passes through the buttress boundary-corresponding position PD and is normal to the tire inner surface 2N.

As described above, in the tire 2, from the viewpoint of mass reduction, the carcass 12 can be composed of only one carcass ply 42.

In contrast, in a conventional tire, a carcass may be composed of at least two carcass plies. In the tire 2 according to one or more embodiments of the present disclosure, the number of carcass plies 42 included in the carcass 12 thus can be reduced as compared to that of the conventional tire.

In the tire 2, a cord that is thicker than a conventional cord can be used as each carcass cord 44. Specifically, a cord having a total fineness in the range of 6000 to 9000 dtex, for instance, can be used as each carcass cord 44. Each carcass cord 44 of the tire 2 can have a total fineness of not less than 6000 dtex and not greater than 9000 dtex, as an example range.

Since the total fineness of each carcass cord 44 can be not less than 6000 dtex, even though the carcass 12 can be composed of only one carcass ply 42, the carcass 12 can have a required strength. In other words, a decrease in the strength of the carcass 12 composed of one carcass ply 42 can be suppressed.

Since the total fineness of each carcass cord 44 can be not greater than 9000 dtex, for instance, the influence of the carcass cord 44 on the tire mass can be suppressed. The carcass ply 42 including the carcass cords 44 can contribute to mass reduction of the tire 2.

In the tire 2, each carcass cord 44 can be thicker than a conventional carcass cord, and the carcass 12 can be composed of only one carcass ply 42.

In a vulcanization step, there may be a concern that intervals between the carcass cords 44 may widen at the buttress portion and the outer layer 58 of the inner liner 20 may flow into the space between the carcass cords 44. In this case, open thread may occur and the appearance quality of the tire can decrease.

As described above, in the tire 2, the insulation 22 can be located between the carcass 12 and the inner liner 20 and can be located between the first bead 10 and the second bead 10. In particular, in the tire 2, at the buttress portion at which the intervals between the carcass cords 44 widen, the ratio (ta/td) of the thickness to of the topping rubber 46 located between the insulation 22 and the carcass cords 44 to the thickness td of the insulation 22 may be not less than 0.2 and not greater than 0.6, for instance.

Since the ratio (ta/td) can be not less than 0.2, the influence of the insulation 22 on mass can be suppressed. In the tire 2, the fact that the carcass 12 can be composed of only one carcass ply 42 can effectively contribute to mass reduction.

Since the ratio (ta/td) may be not greater than 0.6, the insulation 22 can suppress the flow of the outer layer 58 into the space between the carcass cords 44. The insulation 22 can contribute to suppressing occurrence of open thread. The tire 2 can thus have suitable (e.g., good) appearance quality.

The tire 2 can achieve mass reduction while suppressing a decrease in the strength of the carcass 12 without impairing appearance quality.

In a conventional tire in which no insulation 22 is provided, in the case of using a thick cord as each carcass cord, in order to suppress occurrence of open thread, for example, adjustment such as decreasing the holding force of wefts in a fabric including the carcass cords as warps can be required.

On other hand, in the tire 2 according to one or more embodiments of the present disclosure, even though a thick cord is used as each carcass cord 44, adjustment of the wefts, etc., is unnecessary. In other words, in the tire 2 according to one or more embodiments of the disclosed subject matter, it may not be necessary to provide a special step for obtaining the carcass 12 that can contribute to mass reduction. The carcass 12 can thus be formed for which adjustment of the wefts, etc., may be unnecessary.

The tire 2 according to one or more embodiments of the present disclosure can achieve mass reduction while suppressing a decrease in the strength of the carcass 12 without increasing the production cost and without impairing appearance quality.

As described above, in the tire 2, the ratio (ta/td) of the thickness to of the topping rubber 46 located between the insulation 22 and the carcass cords 44 to the thickness td of the insulation 22 can be not less than 0.2 and not greater than 0.6, as an example range.

From the viewpoint of obtaining the tire 2 that can achieve mass reduction while suppressing a decrease in the strength of the carcass 12 without impairing appearance quality, for instance, the ratio (ta/td) can be not less than 0.3, for example, not greater than 0.5.

In the tire 2, the ratio ($E^*r/E^*t$) of a complex elastic modulus $E^*r$ of the insulation 22 to the complex elastic modulus $E^*t$ of the outer layer 58 can be not less than 1.0 and not greater than 2.0, for instance.

According to one or more embodiments, when the ratio ($E^*r/E^*t$) is set to be not less than 1.0, for instance, the insulation 22 may suppress the flow of the outer layer 58 into the space between the carcass cords 44. In the tire 2 according to one or more embodiments of the present disclosure, occurrence of open thread can be effectively suppressed. From this viewpoint, the ratio ($E^*r/E^*t$) can be not less than 1.3, for example, not less than 1.5.

According to one or more embodiments, when the ratio ($E^*r/E^*t$) is set to be not greater than 2.0, for instance, heat generation of the insulation 22 itself can be suppressed. In the tire 2, low rolling resistance can be maintained. From this viewpoint, the ratio ($E^*r/E^*t$) can be not greater than 1.8, for example, not greater than 1.6.

In the tire 2, the thickness td of the insulation 22 can be not less than 0.2 mm and not greater than 0.8 mm, as an example range.

According to one or more embodiments, when the thickness td is set to be not less than 0.2 mm, for instance, the insulation 22 can effectively contribute to suppressing the flow of the outer layer 58 into the space between the carcass cords 44. In the tire 2 according to one or more embodiments of the present disclosure, occurrence of open thread can be more effectively suppressed. From this viewpoint, the thickness td can be not less than 0.3 mm, for instance, not less than 0.4 mm.

According to one or more embodiments, when the thickness td is set to be not greater than 0.8 mm, for instance, the influence of the insulation 22 on mass may be suppressed. The insulation 22 can contribute to mass reduction of the tire 2. From this viewpoint, the thickness td can be not greater than 0.7 mm, for instance, not greater than 0.6 mm.

In FIG. 2, a length indicated by reference character D can be regarded as the distance between the carcass cords 44 in the carcass ply 42. As described above, in the tire 2 according to one or more embodiments of the present disclosure, a cord having a total fineness in the range of 6000 to 9000 dtex, for example, can be used as each carcass cord 44. Optionally, the distance D between the carcass cords 44 can be uniform.

In the tire 2, the ratio (D/GD) of the distance D between the carcass cords 44 in the carcass ply 42 to the outer diameter GD of the carcass cord 44 can be not less than 0.15 and not greater than 0.45, for instance.

According to one or more embodiments, when the ratio (D/GD) is set to be not less than 0.15, for instance, the carcass 12 can effectively contribute to mass reduction of the tire 2. From this viewpoint, for instance, the ratio (D/GD) can be not less than 0.20.

According to one or more embodiments, when the ratio (D/GD) is set to be not greater than 0.45, for instance, the strength of the carcass 12 can be appropriately maintained. From this viewpoint, the ratio (D/GD) can be not greater than 0.40, as an example.

Figure 3:
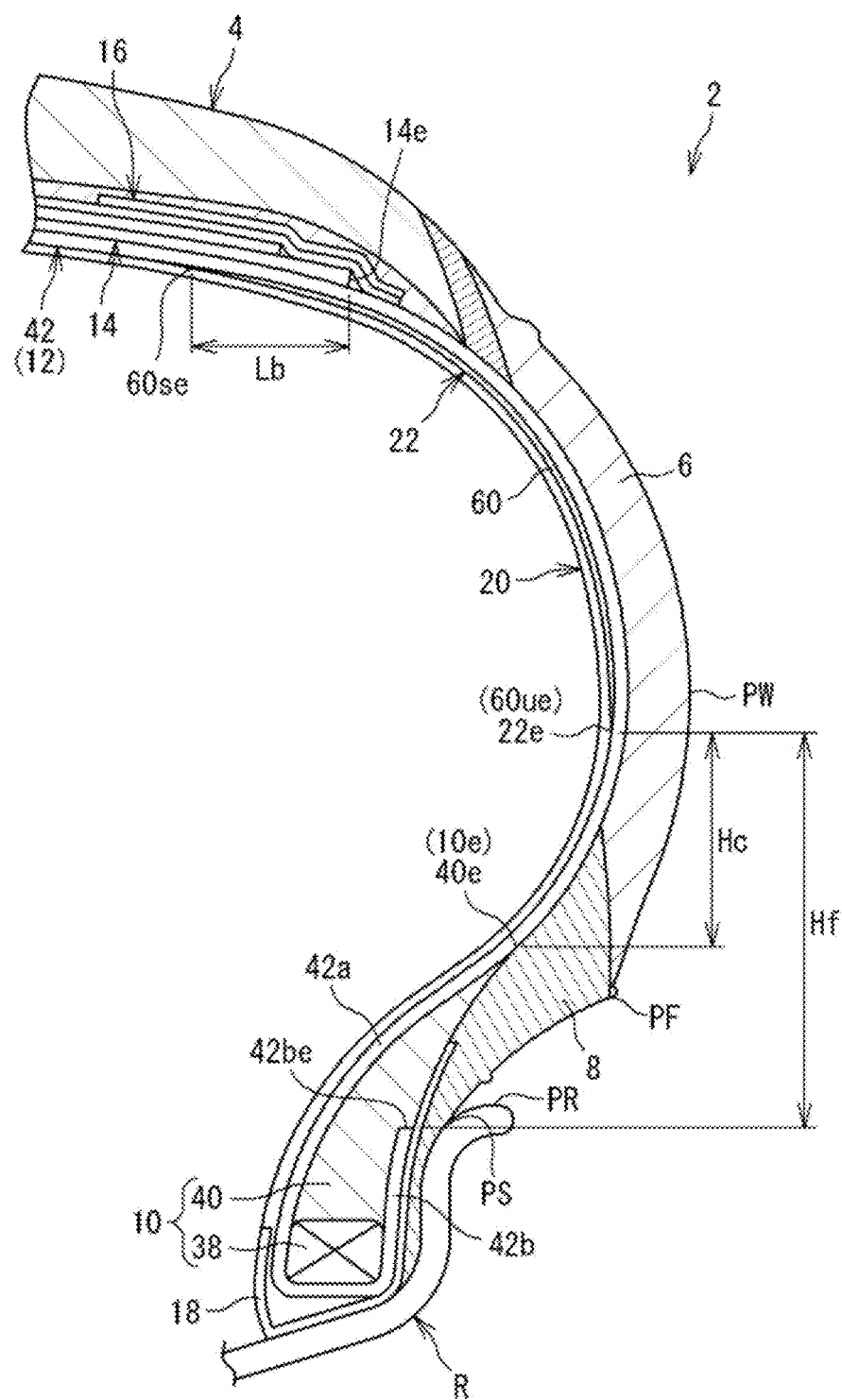
FIG. 3 is a cross-sectional view showing a part of the tire shown in FIG. 1.

FIG. 3 shows a part of the cross-section of the tire 2 shown in FIG. 1. FIG. 3 shows a portion from an end portion of a tread portion to a bead portion.

The end 22e of the insulation 22 can be located radially outward of the outer end 40e of the apex 40.

At a portion on the radially inner side of the outer end 40e of the apex 40, the apex 40 can be stacked on the carcass ply 42. As described above, the apex 40 can be formed from a crosslinked rubber that has high stiffness. In the tire 2, the apex 40 can restrict the movement of the carcass cord 44, for instance, due to a shape change in the vulcanization step. In the tire 2, open thread may be less likely to occur even though the insulation 22 may not be provided at the portion on the radially inner side of the outer end 40e of the apex 40. Since the end 22e of the insulation 22 can be located radially outward of the outer end 40e of the apex 40, the influence of the insulation 22 on the mass of the tire 2 can be effectively suppressed. The tire 2 can achieve mass reduction while maintaining suitable (e.g., good) appearance quality. From this viewpoint, the end 22e of the insulation 22 can be located radially outward of the outer end 40e of the apex 40.

In FIG. 3, a length indicated by reference character Hc can be the distance in the radial direction from the end 22e of the insulation 22 to the outer end 40e of the apex 40. In the present disclosure, in the case where the end 22e of the insulation 22 is located radially outward of the outer end 40e of the apex 40, the distance Hc in the radial direction can be represented by a positive number.

In the tire 2, the ratio (Hc/HS) of the distance Hc in the radial direction to the tire cross-sectional height HS can be not less than 0.15 and not greater than 0.35, for instance.

According to one or more embodiments, when n the ratio (Hc/HS) is set to be not less than 0.15, for instance, the influence of the insulation 22 on mass can be effectively suppressed. The insulation 22 can contribute to mass reduction of the tire 2. From this viewpoint, for instance, the ratio (Hc/HS) can be not less than 0.20.

According to one or more embodiments, when the ratio (Hc/HS) is set to be not greater than 0.35, for instance, the insulation 22 can effectively contribute to suppressing occurrence of open thread at the buttress portion. In the tire 2, suitable (e.g., good) appearance quality can be maintained. From this viewpoint, for instance, the ratio (Hc/HS) can be not greater than 0.30.

In the tire 2, the end 42be of the turned-up portion 42b can be located radially outward of the core 38. The end 42be of the turned-up portion 42b can be located radially inward of the maximum width position PW. The carcass 12 of the tire 2 can have a low turned-up structure. For example, as shown in FIG. 3, the end 42be of the turned-up portion 42b of the tire 2 can be located radially inward of the outer end 40e of the apex 40. The carcass 12 having the turned-up portion 42b can contribute to mass reduction of the tire 2. From this viewpoint, for instance, the end 42be of the turned-up portion 42b can be located radially inward of the outer end 40e of the apex 40.

In FIG. 3, a position indicated by reference character PR can be regarded as a radially outer end of the rim R. The end 42be of the turned-up portion 42b of the tire 2 can be located radially inward of the outer end PR of the rim R. Accordingly, concentration of strain on the end 42be of the turned-up portion 42b can be suppressed. The tire 2 can achieve mass reduction while maintaining good durability. From this viewpoint, for instance, the end 42be of the turned-up portion 42b can be located radially inward of the outer end PR of the rim R.

As shown in FIG. 3, in the tire 2, the outer end 40e of the apex 40 can be located radially inward of the end 22e of the insulation 22, and the end 42be of the turned-up portion 42b can be located radially inward of the outer end 40e of the apex 40.

In the tire 2, the end 42be of the turned-up portion 42b can be located radially inward of the end 22e of the insulation 22.

In FIG. 3, a length indicated by reference character Hf can be regarded as the distance in the radial direction from the end 22e of the insulation 22 to the end 42be of the turned-up portion 42b.

In the tire 2, the ratio (Hf/Hc) of the distance Hf in the radial direction to the distance Hc in the radial direction from the end 22e of the insulation 22 to the outer end 40e of the apex 40 can be not less than 1.2 and not greater than 2.0, as an example range.

According to one or more embodiments, when the ratio (Hf/Hc) is set to be not less than 1.2, for instance, the insulation 22 can effectively contribute to suppressing occurrence of open thread at the buttress portion. In the tire 2, suitable (e.g., good) appearance quality can be maintained. From this viewpoint, the ratio (Hf/Hc) can be not less than 1.3, for instance, not less than 1.4.

According to one or more embodiments, when the ratio (Hf/Hc) is set to be not greater than 2.0, for instance, the influence of the insulation 22 on mass can be effectively suppressed. The insulation 22 can contribute to mass reduction of the tire 2. From this viewpoint, for instance, the ratio (Hf/Hc) can be not greater than 1.8, for example, not greater than 1.6.

As shown in FIG. 1, the insulation 22 of the tire 2 can include a pair of rubber layers 60. The pair of rubber layers 60 can be arranged so as to be spaced apart from each other in the axial direction with the equator plane CL therebetween.

An inner end 60ue of each rubber layer 60 can be the end 22e of the insulation 22. The inner end 60ue of the rubber layer 60 can be located radially outward of the outer end 40e of the apex 40.

On the radially inner side of the inner end 60ue of the rubber layer 60, the outer layer 58 of the inner liner 20 can be attached to the carcass ply 42. At a portion from the inner end 60ue to an outer end 60se of the rubber layer 60, the outer layer 58 can be attached to the carcass ply 42 via the rubber layer 60. At a portion between the outer end 60se of a first rubber layer 60 and the outer end 60se of a second rubber layer 60 (not shown), the outer layer 58 can be attached to the carcass ply 42.

The tire 2, according to one or more embodiments of the present disclosure, may not have a third rubber layer 60 between the first rubber layer 60 and the second rubber layer 60. The insulation 22 in which no third rubber layer 60 exists between the first rubber layer 60 and the second rubber layer 60 can contribute to mass reduction of the tire 2. From this viewpoint, for instance, the insulation 22 can include the pair of rubber layers 60 arranged so as to be spaced apart from each other in the axial direction with the equator plane CL therebetween.

In a region from the outer end 60se of the first rubber layer 60 to the outer end 60se of the second rubber layer 60, the belt 14 can be located radially outward of the carcass 12. The belt 14 can restrict the movement of the carcass cord 44 due to a shape change in the vulcanization step. In the tire 2, open thread can be less likely to occur even in a case where no rubber layer 60 is provided between the first rubber layer 60 and the second rubber layer 60. The tire 2 can achieve mass reduction while maintaining suitable (e.g., good) appearance quality.

In the tire 2, the outer end 60se of the rubber layer 60 can be located axially inward of the end 14e of the belt 14. Accordingly, the rubber layer 60 can effectively suppress occurrence of open thread at the buttress portion which is formed with a small thickness in the tire 2. The tire 2 can achieve mass reduction while maintaining good appearance quality. From this viewpoint, the outer end 60se of the rubber layer 60 can be located axially inward of the end 14e of the belt 14.

In FIG. 3, a length indicated by reference character Lb can be regarded as the distance in the axial direction from the outer end 60se of the rubber layer 60 to the end 14e of the belt 14. In the present disclosure, in the case where the outer end 60se of the rubber layer 60 is located axially inward of the end 14e of the belt 14, the distance Lb in the axial direction can be represented by a positive number.

In the tire 2, the distance Lb in the axial direction can be not less than 10 mm and not greater than 50 mm, as an example range.

According to one or more embodiments, when the distance Lb in the axial direction is set to be not less than 10 mm, for instance, the rubber layer 60 can effectively suppress occurrence of open thread at the buttress portion. Moreover, since the outer end 60se of the rubber layer 60 can be located away from the end 14e of the belt 14, concentration of strain on the end 14e of the belt 14 can be suppressed. In the tire 2, suitable (e.g., good) durability can be maintained. From this viewpoint, for instance, the distance Lb in the axial direction can be not less than 20 mm, for example, not less than 25 mm.

According to one or more embodiments, when the distance Lb in the axial direction is set to be not greater than 50 mm, for instance, the insulation 22 composed of the pair of rubber layers 60 can effectively contribute to mass reduction. From this viewpoint, for instance, the distance Lb in the axial direction can be not greater than 40 mm, for example, not greater than 35 mm.

Figure 4:
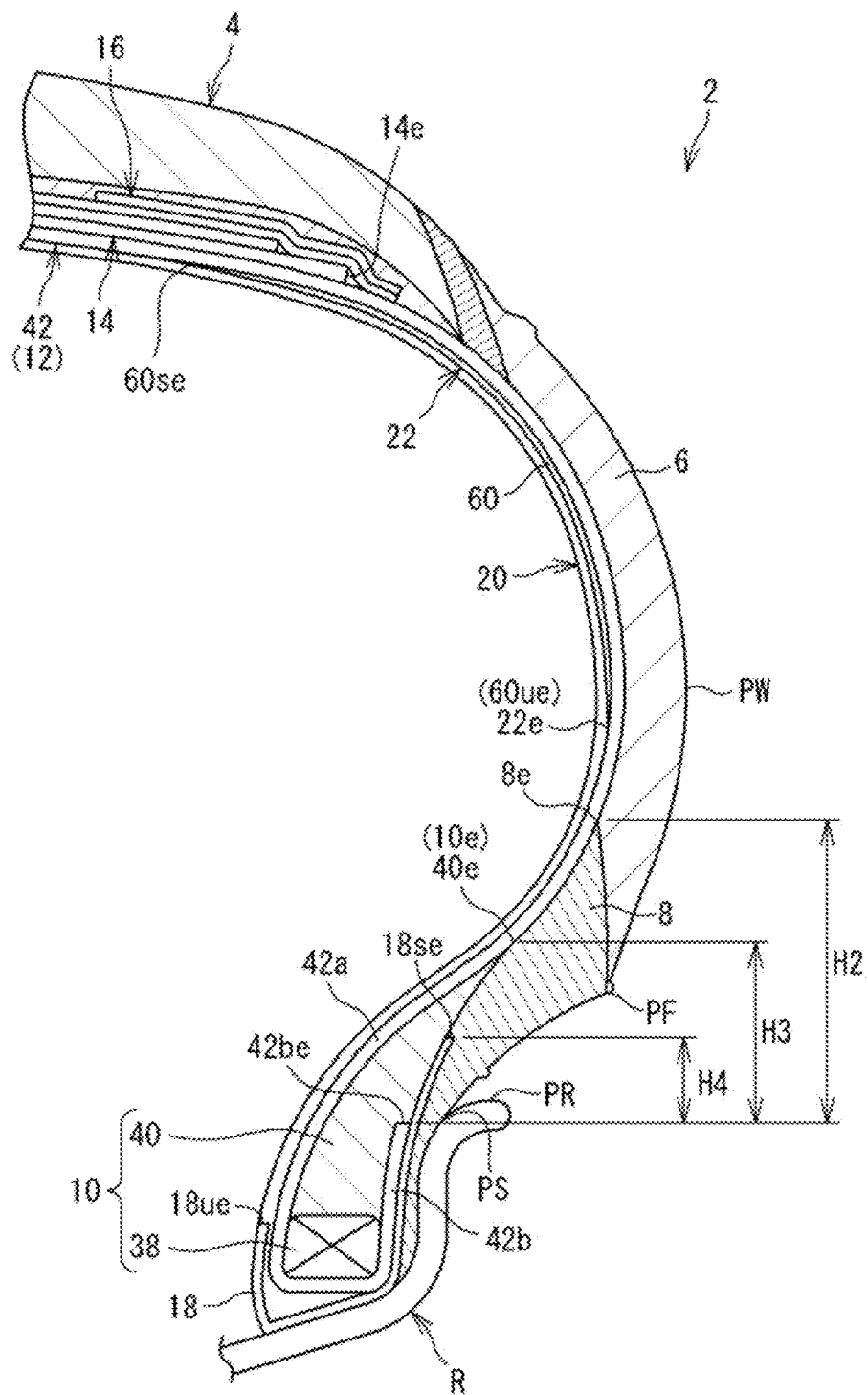
FIG. 4 is a cross-sectional view showing a part of the tire shown in FIG. 1.

FIG. 4 shows a part of the cross-section of the tire 2 shown in FIG. 1. FIG. 4 shows the portion from the end portion of the tread portion to the bead portion.

In the tire 2, the outer end 40e of the apex 40 can be located radially inward of the outer end 8e of the clinch 8. The outer end 18se of the chafer 18 can be located radially inward of the outer end 40e of the apex 40. The end 42be of the turned-up portion 42b can be located radially inward of the outer end 18se of the chafer 18.

In FIG. 4, a length indicated by reference character H2 can be regarded as the distance in the radial direction from the end 42be of the turned-up portion 42b to the outer end 8e of the clinch 8. A length indicated by reference character H3 can be regarded as the distance in the radial direction from the end 42be of the turned-up portion 42b to the outer end 40e of the apex 40. A length indicated by reference character H4 can be regarded as the distance in the radial direction from the end 42be of the turned-up portion 42b to the outer end 18se of the chafer 18.

In the tire 2, the end 42be of the turned-up portion 42b can be located radially inward of the outer end 8e of the clinch 8. The end 42be of the turned-up portion 42b can be located so as to be spaced apart from the outer end 8e of the clinch 8. Accordingly, occurrence of damage starting from interface separation between the sidewall 6 and the clinch 8 can be suppressed. In the tire 2, suitable (e.g., good) durability can be maintained. From this viewpoint, for instance, the distance H2 in the radial direction from the end 42be of the turned-up portion 42b to the outer end 8e of the clinch 8 can be not less than 5 mm, for example, not less than 20 mm. From the viewpoint of forming the turned-up portion 42b having a sufficient length and stably fixing the carcass ply 42 to the bead 10, for instance, the distance H2 in the radial direction can be not greater than 35 mm, for example, not greater than 30 mm.

In the tire 2, the end 42be of the turned-up portion 42b can be located radially inward of the outer end 40e of the apex 40. The end 42be of the turned-up portion 42b can be located so as to be spaced apart from the outer end 40e of the apex 40. Accordingly, occurrence of damage starting from interface separation around the outer end 40e of the apex 40 can be suppressed. In the tire 2, suitable (e.g., good) durability can be maintained. From this viewpoint, for instance, the distance H3 in the radial direction from the end 42be of the turned-up portion 42b to the outer end 40e of the apex 40 can be not less than 3 mm, for example, not less than 5 mm. From the viewpoint of forming the turned-up portion 42b having a sufficient length and stably fixing the carcass ply 42 to the bead 10, for instance, the distance H3 in the radial direction can be not greater than 25 mm, for example, not greater than 20 mm.

In the tire 2, the end 42be of the turned-up portion 42b can be located radially inward of the outer end 18se of the chafer 18. The end 42be of the turned-up portion 42b can be located so as to be spaced apart from the outer end 18se of the chafer 18. Accordingly, occurrence of damage starting from interface separation around the outer end 18se of the chafer 18 can be suppressed. In the tire 2, suitable (e.g., good) durability can be maintained. From this viewpoint, for instance, the distance H4 in the radial direction from the end 42be of the turned-up portion 42b to the outer end 18se of the chafer 18 can be not less than 3 mm, for example, not less than 8 mm. From the viewpoint of forming the turned-up portion 42b having a sufficient length and stably fixing the carcass ply 42 to the bead 10, for instance, the distance H4 in the radial direction can be not greater than 20 mm, for example, not greater than 15 mm.

Figure 5:
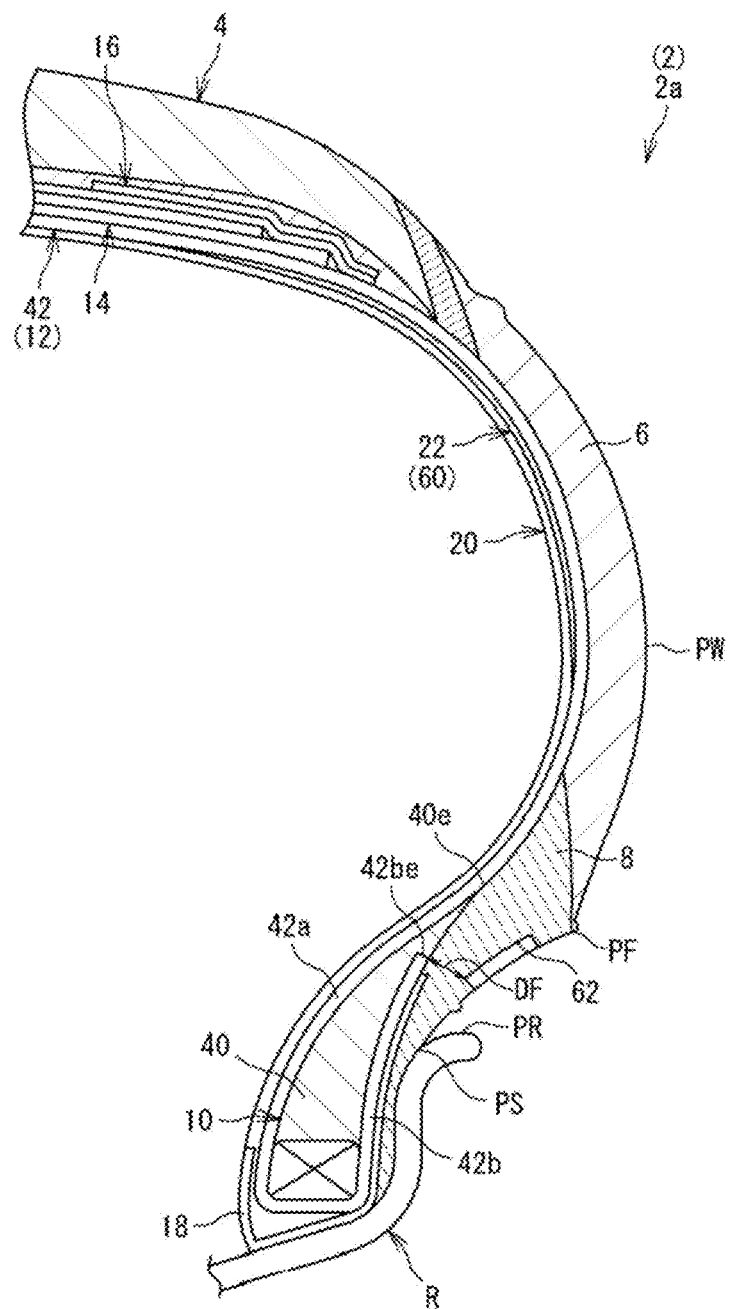
FIG. 5 is a cross-sectional view showing a first modification of the tire shown in FIG. 1.

FIG. 5 shows a modification of the tire 2 shown in FIG. 1 (hereinafter, tire 2a). FIG. 5 shows a part of a meridian cross-section of the tire 2a.

In the tire 2a shown in FIG. 5, the end 42be of the turned-up portion 42b can be located radially inward of the maximum width position PW. The carcass 12 of the tire 2a can have a low turned-up structure.

The end 42be of the turned-up portion 42b can be located radially inward of the outer end 40e of the apex 40. The end 42be of the turned-up portion 42b can be located radially outward of the outer end PR of the rim R.

As described above, each carcass cord 44 can be thicker than a conventional one.

As shown in FIG. 5, in the tire 2a, a dimple 62 can be provided on the tire outer surface 2G. The dimple 62 can be provided on a portion, of the tire outer surface 2G, between the reference position PF and the contact surface outer end position PS. The dimple 62 may be included to address potential concentration of strain on the end 42be of the turned-up portion 42b.

Figure 6:
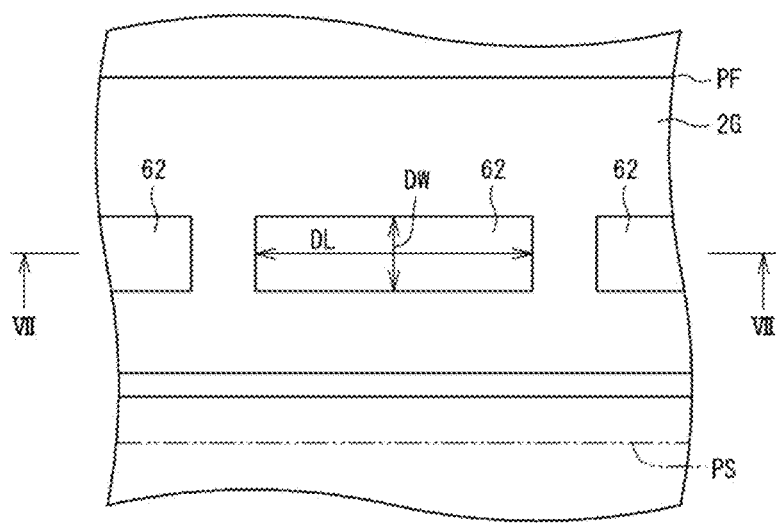
FIG. 6 is a cross-sectional view showing a part of a side surface of the tire shown in FIG. 4.

FIG. 6 shows a part of the tire outer surface 2G of the tire 2a. FIG. 6 is a development of the portion on which the dimple 62 can be provided. In FIG. 6, the right-left direction is the circumferential direction of the tire 2a. The up-down direction is the radial direction of the tire 2a.

As shown in FIG. 6, a relatively large number of dimples 62 can be provided on the tire outer surface 2G, for instance, so as to be aligned in the circumferential direction. Optionally, these dimples 62 can be arranged at equal intervals. Each dimple 62 can have a rectangular shape, as but one example. According to one or more embodiments, the dimple 62 can be relatively long in the circumferential direction and relatively short in the radial direction.

During running of the tire 2a, each dimple 62 can move against the wind, which can disturb the air flow around the dimple 62. Accordingly, a rise in the temperature around the dimple 62 can be suppressed.

As shown in FIG. 5, the dimple 62 can be located near the end 42*be* of the turned-up portion 42*b*. Even in the event that strain is concentrated on the end 42*be* of the turned-up portion 42*b*, the dimple 62 can promote heat dissipation, so that a rise in temperature can be suppressed. In the tire 2*a*, suitable (e.g., good) durability and relatively low rolling resistance can be maintained. From this viewpoint, for instance, in the case where the end 42*be* of the turned-up portion 42*b* is located radially outward of the outer end PR of the rim R, the dimple 62 can be provided near the end 42*be* of the turned-up portion 42*b*.

In FIG. 5, a length indicated by reference character DF can be regarded as the shortest distance from the dimple 62 to the turned-up portion 42*b*.

From the viewpoint of maintaining good durability and low rolling resistance, for instance, the shortest distance DF can be not greater than 10 mm. From the viewpoint that the dimple 62 can sufficiently exhibit its heat dissipation effect, for instance, the shortest distance DF can be not less than 2 mm.

In FIG. 6, a length indicated by reference character DL can be regarded as the length of the dimple 62. The length DL can be measured along a width center line of the dimple 62 in the radial direction. A length indicated by reference character DW can be regarded as the width of the dimple 62. The width DW can be measured along a length center line of the dimple 62 in the circumferential direction.

From the viewpoint that the dimple 62 can sufficiently exhibit its heat dissipation effect, for instance, the length DL of the dimple 62 can be not less than 15 mm, for example, not less than 17 mm. The length DL can be not greater than 30 mm, for instance, not greater than 23 mm.

From the same viewpoint, for instance, the width DW of the dimple 62 can be not less than 8.5 mm, for example, not less than 8.8 mm. The width DW can be not greater than 12 mm, for instance, not greater than 9.2 mm.

Figure 7:
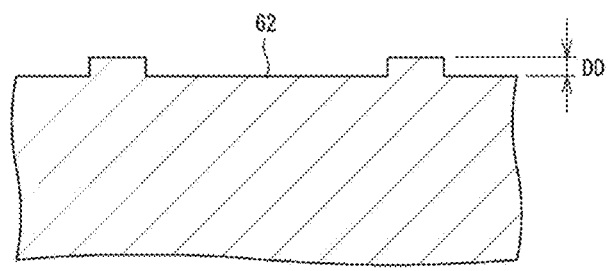
FIG. 7 is a cross-sectional view taken along a line VII-VII in FIG. 6.

FIG. 7 shows a cross-section of the dimple 62. A line VII-VII in FIG. 6 includes the width center line of the dimple 62 in the radial direction. In FIG. 7, a length indicated by reference character DD can be regarded as the depth of the dimple 62.

In the tire 2*a*, from the viewpoint that the dimple 62 can sufficiently exhibit its heat dissipation effect, for instance, the depth DD of the dimple 62 can be not less than 1.5 mm, for example, not less than 1.8 mm. The depth DD can be not greater than 2.5 mm, for instance, not greater than 2.2 mm.

Figure 8:
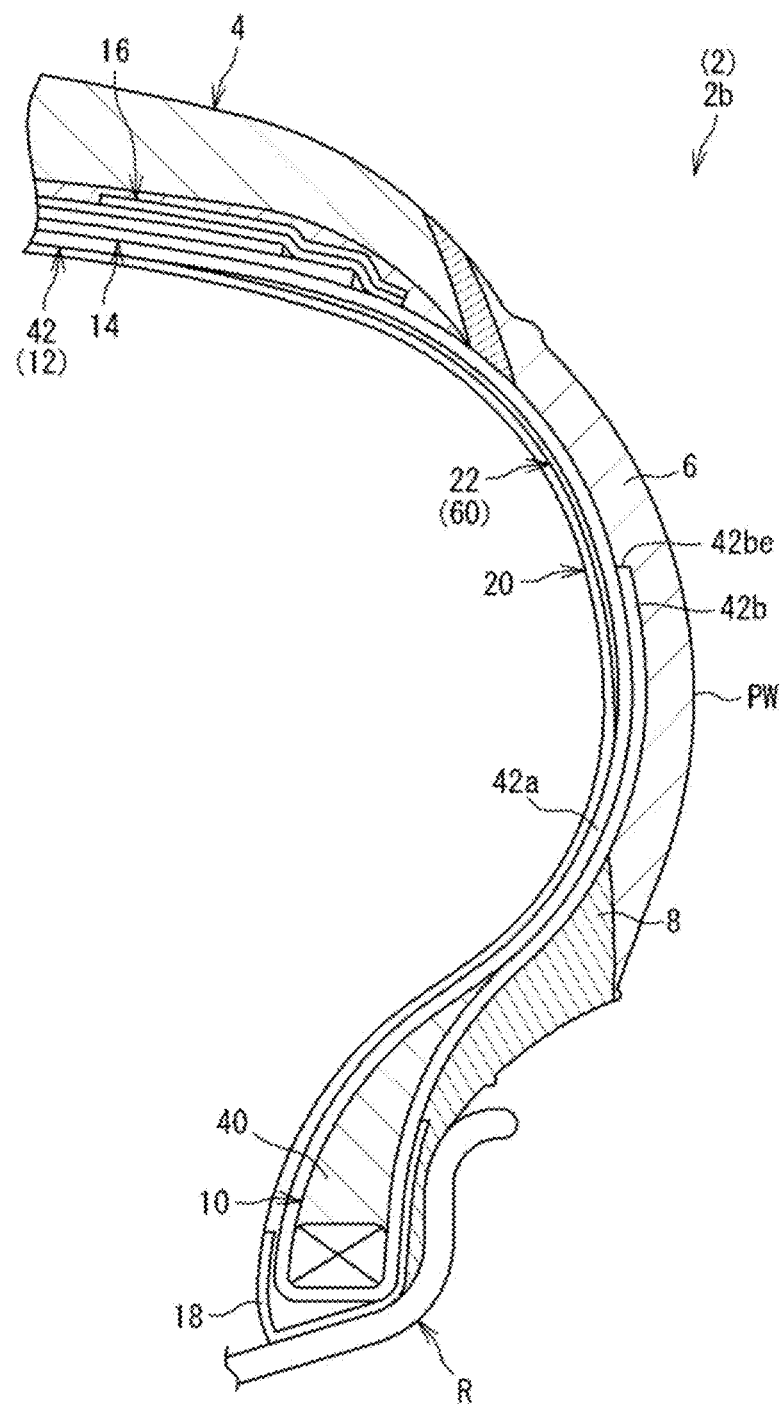
FIG. 8 is a cross-sectional view showing a second modification of the tire shown in FIG. 1.

FIG. 8 shows a modification of the tire 2 shown in FIG. 1 (hereinafter, tire 2*b*). FIG. 8 shows a part of a meridian cross-section of the tire 2*b*.

In the tire 2*b* shown in FIG. 8, the end 42*be* of the turned-up portion 42*b* can be located radially outward of the maximum width position PW. The carcass 12 of the tire 2*b* can have a high turned-up structure.

This carcass 12, according to one or more embodiments of the present disclosure, can particularly contribute to improvement of the stiffness of each side portion. The mass of the tire 2*b* can be increased (e.g., slightly increased) as compared to that of the tire 2 shown in FIG. 1.

The carcass 12, according to one or more embodiments of the present disclosure, can be lighter than a conventional carcass that is composed of two carcass plies and has a high turned-up structure. The tire 2*b* can also achieve mass reduction while suppressing a decrease in the strength of the carcass 12 without impairing appearance quality.

Figure 9:
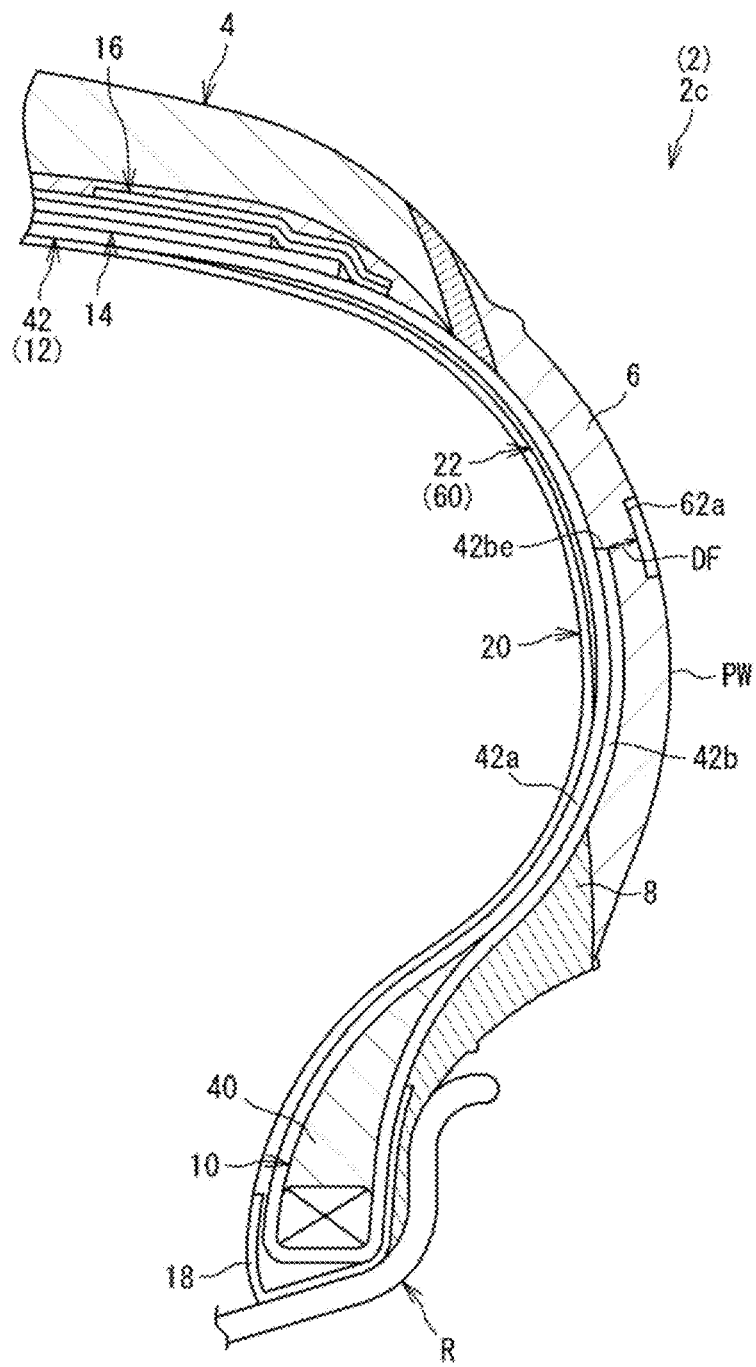
FIG. 9 is a cross-sectional view showing a modification of the tire shown in FIG. 8.

FIG. 9 shows a modification of the tire 2*b* shown in FIG. 8 (hereinafter, tire 2*c*). FIG. 9 shows a part of a meridian cross-section of the tire 2*c*.

As shown in FIG. 9, in the tire 2*c*, a dimple 62*a* can be provided near the end 42*be* of the turned-up portion 42*b*. The dimple 62*a* can be formed with the same specifications as those of the dimple 62 shown in FIG. 5.

As described above, each carcass cord 44 can be thicker than a conventional one.

In the tire 2*c*, the dimple 62*a* can be located near the end 42*be* of the turned-up portion 42*b*. In the event that strain happens to be concentrated on the end 42*be* of the turned-up portion 42*b*, the dimple 62*a* can promote heat dissipation, so that a rise in temperature can be suppressed. In the tire 2*c*, suitable (e.g., good) durability and low rolling resistance can be maintained. From this viewpoint, for instance, in the case where the carcass 12 has a high turned-up structure, the dimple 62*a* can be provided in a zone from the position away radially outward from the end 42*be* of the turned-up portion 42*b* by 10 mm to the position away radially inward from the end 42*be* of the turned-up portion 42*b* by 10 mm, as example distances. Furthermore, in this case, the shortest distance DF from the dimple 62*a* to the end 42*be* of the turned-up portion 42*b* can be not less than 2 mm and not greater than 10 mm, as an example range.

Second Embodiment

Figure 10:
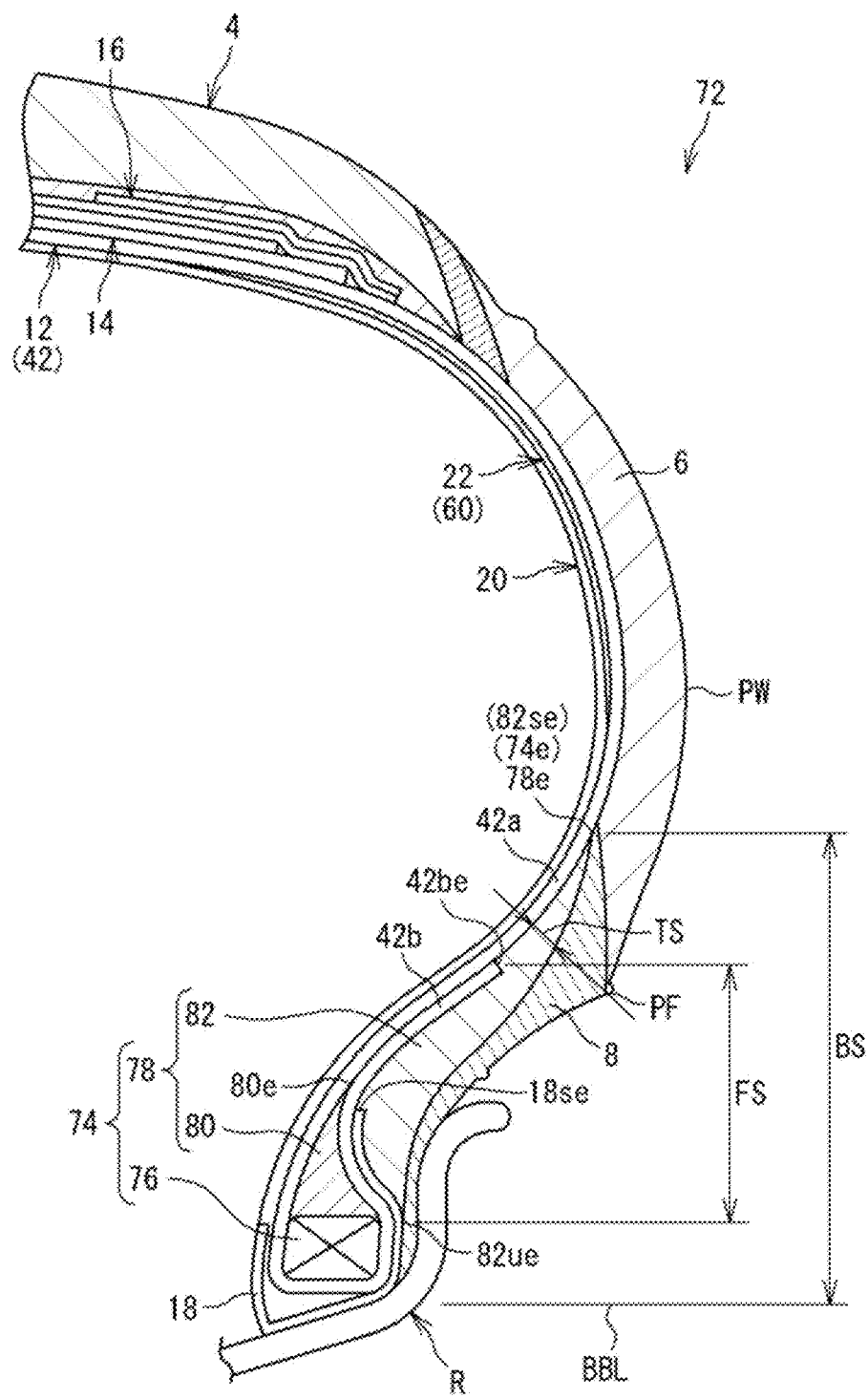
FIG. 10 is a cross-sectional view showing a part of a tire according to a second embodiment of the present disclosure.

FIG. 10 shows a part of a tire 72 according to a second embodiment of the present disclosure. The tire 72 can be a pneumatic tire for a passenger car, for instance.

In the tire 72, beads 74 different from the beads 10 of the tire 2 shown in FIG. 1 can be used. Accordingly, although the configurations of the clinches 8, the carcass 12, and the chafers 18 in the tire 2 may be regarded as slightly changed, the configuration of the tire 72 other than the beads 74 can be substantially the same as that of the tire 2 shown in FIG. 1. The components of the tire 72 other than the beads 74 are designated by the same reference characters as those for the tire 2 shown in FIG. 1, and the detailed description thereof is omitted.

In the tire 72 as well, the carcass 12 can be composed of one carcass ply 42. That is, the carcass 12 can have only one carcass ply 42. The carcass 12 can contribute to mass reduction of the tire 72.

Since the carcass ply 42 can include carcass cords each having a total fineness of not less than 6000 dtex, for instance, even though the carcass 12 can be composed of only one carcass ply 42, a decrease in the strength of the carcass 12 can be suppressed. Since the carcass ply 42 can include carcass cords each having a total fineness of not greater than 9000 dtex, for instance, the carcass 12 can contribute to mass reduction of the tire 72.

The insulation 22 can be located between the carcass 12 and the inner liner 20 and can be located between a first bead 74 and a second bead 74. The insulation 22 can suppress the flow of the outer layer of the inner liner 20 into the space between the carcass cords. The insulation 22 can contribute to suppressing occurrence of open thread. The tire 72 can have suitable (e.g., good) appearance quality.

The tire 72 can also achieve mass reduction while suppressing a decrease in the strength of the carcass 12 without impairing appearance quality.

Similar to the beads 10, each bead 74 of the tire 72 can also include a core 76 and an apex 78. The core 76 can have the same configuration as that of the core 38 of the bead 10. The core 76 can extend in the circumferential direction. The apex 78 can be located radially outward of the core 76. The apex 78 can be tapered radially outward as a whole. An outer end 78e of the apex 78 can be located radially inward of the maximum width position PW. The outer end 78e of the apex 78 can be an outer end 74e of the bead 74. According to one or more embodiments, entirety of the bead 74 can be located radially inward of the maximum width position PW.

In the tire 72, the apex 78 can be composed of two components. The apex 78 can include a first apex 80 and a second apex 82. According to one or more embodiments, the apex 78 can consist of the first apex 80 and the second apex 82.

The first apex 80 can be located radially outward of the core 76. The first apex 80 can be stacked on the core 76. The first apex 80 can be tapered radially outward. The material of the first apex 80 can be the same as that of the above-described apex 40. The length of the first apex 80 can be not less than 5 mm and not greater than 20 mm, as an example range. The first apex 80 can be shorter than the apex 40.

As shown in FIG. 10, the core 76 and the first apex 80 can be located between the ply body 42a and the turned-up portion 42b. At a portion on the radially outer side of the first apex 80, the turned-up portion 42b can be directly attached to the ply body 42a. The core 76 and the first apex 80 can be surrounded by the carcass ply 42.

The second apex 82 can be located radially outward of the first apex 80. The second apex 82 can be located between the carcass 12 and the clinch 8. The end 42be of the turned-up portion 42b can be interposed between the ply body 42a and the second apex 82. The outer end 18se of the chafer 18 can be located between the turned-up portion 42b and the second apex 82. As shown in FIG. 10, the second apex 82 can be thick around an outer end 80e of the first apex 80. The second apex 82 can be tapered radially outward from the thick portion thereof. The second apex 82 can be tapered radially inward from the thick portion thereof.

In the tire 2 shown in FIG. 1, according to one or more embodiments of the present disclosure, a portion, but not the entirety, of each bead 10, can be surrounded by the carcass ply 42.

In the tire 2b shown in FIG. 8, the entirety of each bead 10 can be surrounded by the carcass ply 42. However, strain may be concentrated on the end 42be of the turned-up portion 42b. The concentration of strain may decrease the durability of the tire 2.

In the tire 72, as described above, the core 76 and the first apex 80 can be surrounded by the carcass ply 42, and the turned-up portion 42b can be directly attached to the ply body 42a at the portion on the radially outer side of the first apex 80. The second apex 82 can be disposed radially outward of the first apex 80 with the turned-up portion 42b therebetween.

The configuration of the bead 74 of the tire 72 can increase the cross-sectional secondary moment. Since a cord thicker than a conventional one can be used as each carcass cord, a larger cross-sectional secondary moment can be obtained in the tire 72 than in the tire 2 shown in FIG. 1. A larger cornering force can be generated, so that a vehicle may be less likely to fall down even when a high load is applied to the vehicle during cornering. The tire 72 can improv falling-down resistance.

Since the end 42be of the turned-up portion 42b can be surrounded by the second apex 82, damage due to concentration of strain on the end 42be of the turned-up portion 42b can be less likely to occur. In the tire 72, a decrease in durability can be suppressed.

In the tire 72, the carcass 12 composed of one carcass ply 42 can sufficiently exhibit its function.

In FIG. 10, a length indicated by reference character TS can be regarded as the thickness of the second apex 82 at the reference position PF. The thickness TS can be measured along a normal line that passes through the reference position PF and is normal to the outer surface of the carcass 12.

In the tire 72, the reference position PF can be located between the maximum width position PW and the rim R in the radial direction. The reference position PF can be located between the outer end 80e of the first apex 80 and an outer end 82se of the second apex 82 in the radial direction.

In the tire 72, the thickness TS of the second apex 82 at the reference position PF can be not less than 2.5 mm and not greater than 4.5 mm, an example range.

According to one or more embodiments, when the thickness TS is set to be not less than 2.5 mm, for instance, the second apex 82 can effectively contribute to generation of a cornering force. The tire 72 can have suitable (e.g., good) falling-down resistance. From this viewpoint, for instance, the thickness TS can be not less than 3.0 mm, for example, not less than 3.5 mm.

According to one or more embodiments, when the thickness TS is set to be not greater than 4.5 mm, for instance, influence of the second apex 82 on mass can be suppressed. The tire 72 can achieve mass reduction. From this viewpoint, the thickness TS can be not greater than 4.0 mm.

In the tire 72, a complex elastic modulus $E^*2$ of the second apex 82 can be equal to or higher than a complex elastic modulus $E^*1$ of the first apex 80. Accordingly, the cross-sectional secondary moment can increase (e.g., increase drastically). In the tire 72, a large cornering force can be generated, for instance, so that suitable (e.g., good) falling-down resistance can be achieved. From this viewpoint, for instance, the complex elastic modulus $E^*2$ of the second apex 82 can be higher than the complex elastic modulus $E^*1$ of the first apex 80. For instance, the ratio $(E^*2/E^*1)$ of the complex elastic modulus $E^*2$ to the complex elastic modulus $E^*1$ can be not less than 1.3. From the viewpoint of being able to suppress occurrence of strain at the boundary between the second apex 82 and the first apex 80 and maintain good durability, for instance, the ratio $(E^*2/E^*1)$ can be not greater than 3.5, for example, not greater than 3.0.

In FIG. 10, a length indicated by reference character FS can be regarded as the distance in the radial direction from an inner end 82ue of the second apex 82 to the end 42be of the turned-up portion 42b. A length indicated by reference character BS can be regarded as the distance in the radial direction from the bead base line BBL to the outer end 82se of the second apex 82.

In the tire 72, the distance FS in the radial direction from the inner end 82ue of the second apex 82 to the end 42be of the turned-up portion 42b can be not less than 10 mm and not greater than 40 mm, for example.

According to one or more embodiments, when the distance FS in the radial direction is set to be not less than 10 mm, for example, the end 42be of the turned-up portion 42b can be located at an appropriate distance from the inner end 82ue of the second apex 82. Accordingly, occurrence of damage due to concentration of strain on the end 42be of the turned-up portion 42b can be suppressed. In the tire 72, suitable (e.g., good) durability can be maintained. From this viewpoint, for instance, the distance FS in the radial direction can be not less than 20 mm.

According to one or more embodiments, when the distance FS in the radial direction is set to be not greater than 40 mm, for instance, the length of the turned-up portion 42b can be appropriately maintained. In the tire 72, the influence of the turned-up portion 42b on mass can be suppressed. The tire 72 can achieve mass reduction. From this viewpoint, for instance, the distance FS in the radial direction can be not greater than 30 mm.

In the tire 72, the distance BS in the radial direction from the bead base line BBL to the outer end 82se of the second apex 82 can be not less than 35 mm and not greater than 55 mm, as an example range.

According to one or more embodiments, when the distance BS in the radial direction is set to be not greater than 35 mm, for instance, the second apex 82 can contribute to an increase in the cross-sectional secondary moment. In the tire 72, suitable (e.g., good) falling-down resistance can be maintained. From this viewpoint, for instance, the distance BS in the radial direction can be not less than 40 mm.

According to one or more embodiments, when the distance BS in the radial direction is set to be not greater than 55 mm, for instance, the volume of the second apex 82 can be appropriately maintained. In the tire 72, heat generation in the second apex 82 can be suppressed, for instance, so that low rolling resistance can be maintained. From this viewpoint, for instance, the distance BS in the radial direction can be not greater than 50 mm.

As described above, according to one or more embodiments of the present disclosure, a tire that can achieve mass reduction while suppressing a decrease in the strength of a carcass without impairing appearance quality can be obtained.

EXAMPLES

Hereinafter, the present disclosure will be described in further detail by means of examples, etc., but the present disclosure is not limited to these examples.

Example 1

A pneumatic tire for a passenger car (tire designation=245/50R18) having the basic structure shown in FIG. 1 and having specifications shown in Table 1 below was obtained.

In Example 1, a cord formed from a polyethylene terephthalate fiber was used as each carcass cord. The cord structure of the carcass cord was 3300 dtex/2 (total fineness=6600 dtex). The fact that the total fineness is not less than 6000 dtex is indicated as "Y" in the cell for thick cord. The number of carcass cords included per 50 mm width of the carcass ply was 40.

The carcass was composed of one carcass ply.

An insulation including a pair of rubber layers was provided between the carcass and the inner liner.

The ratio (ta/td) of the thickness to of the topping rubber located between the insulation and the carcass cords to the thickness td of the insulation was 0.4.

The distance Lb in the axial direction from the outer end of the rubber layer to the end of the belt was 50 mm.

The ratio (Hc/HS) of the distance Hc in the radial direction form the end of the insulation (inner end of the rubber layer) to the outer end of the apex to the tire cross-sectional height HS was 0.17.

The ratio ($E^*r/E^*t$) of the complex elastic modulus $E^*r$ of the insulation to the complex elastic modulus $E^*t$ of the outer layer was 1.0.

Comparative Example 1

A tire of Comparative Example 1 is a conventional tire. The carcass was composed of two carcass plies. Each carcass cord was a cord formed from a polyethylene terephthalate fiber (cord structure=1100 dtex/2). The fact that the total fineness is less than 6000 dtex is indicated as "N" in the cell for thick cord. The number of carcass cords included per 50 mm width of the carcass ply was 48.

In Comparative Example 1, an insulation is not used.

Comparative Example 2

A tire of Comparative Example 2 was obtained in the same manner as Comparative Example 1, except that the same cord as in Example 1 was used as each carcass cord. In Comparative Example 2, the number of carcass cords included per 50 mm width of the carcass ply was 40.

Comparative Example 3

A tire of Comparative Example 3 was obtained in the same manner as Comparative Example 2, except that the carcass was composed of one carcass ply. The position of the end of the turned-up portion was set so as to be the same as in Example 1.

Examples 2 and 3 and Comparative Examples 4 and 5

Tires of Examples 2 and 3 and Comparative Examples 4 and 5 were obtained in the same manner as Example 1, except that the ratio (ta/td) was set as shown in Tables 1 and 2 below.

Example 4

A tire of Example 4 was obtained in the same manner as Example 1, except that the distance Lb in the axial direction was set as shown in Table 2 below.

Example 5

A tire of Example 5 was obtained in the same manner as Example 4, except that the ratio (Hc/HS) was set as shown in Table 2 below.

Example 6

A tire of Example 6 was obtained in the same manner as Example 5, except that the ratio ($E^*r/E^*t$) was set as shown in Table 2 below.

Tire Mass

The mass of each tire was measured. The results are shown as indexes in the cells for "Mass" in Tables 1 and 2 below with the result of Comparative Example 1 being regarded as 100. The higher the value is, the lighter the tire is.

Appearance Quality

The surface condition of each tire inner surface was visually observed. 100 tires were produced, and the number of tires in which open thread occurred was checked to obtain the rate of occurrence of open thread. The results are shown as indexes in the cells for "Appearance quality" in Tables 1 and 2 below with the result of Comparative Example 1 being regarded as 100. The higher the value is, the lower the rate of occurrence is.

Pinch Cut Resistance

A breaking energy of each test tire supported horizontally under conditions of a rim (7.5 J) and an internal pressure (230 kPa) was measured at a carcass maximum width position, using a plunger testing machine, in accordance with Section 6.1 "Tire strength (breaking energy) test" in JIS D4230. The results are shown as indexes in the cells for "Pinch cut resistance" in Tables 1 and 2 below with the result of Comparative Example 1 being regarded as 100. The higher the value is, the better the pinch cut resistance is.

Durability

Each test tire was fitted onto a rim (size=7.5 J) and inflated with air to adjust the internal pressure thereof to 250 kPa. The tire was mounted to a drum type tire testing machine. A vertical load of 9.54 kN was applied to the tire, and the tire was caused to run on a drum (radius=1.7 m) at a speed of 100 km/h. The running distance was measured until damage to the tire was observed. The results are shown as indexes in the cells for "Durability" in Tables 1 and 2 below with the result of Comparative Example 1 being regarded as 100. The higher the value is, the better the durability is.

Rolling Resistance

Using a rolling resistance testing machine, a rolling resistance coefficient (RRC) was measured when each test tire ran on a drum at a speed of 80 km/h under the following conditions. The results are shown as indexes in the cells for "RRC" in Tables 1 and 2 below with the result of Comparative Example 1 being regarded as 100. The higher the value is, the lower the rolling resistance of the tire is.

Rim: 7.5 J

Internal pressure: 210 kPa

Vertical load: 6.28 kN

Combined Performance

The sum of the indexes obtained in the respective evaluations was calculated. The results are shown in the cells for "Combined" in Tables 1 and 2 below. The higher the value is, the better the performance is.

TABLE 1

|  | Comp. Ex. 1 | Comp. Ex. 2 | Comp. Ex. 3 | Comp. Ex. 4 | Ex. 2 | Ex. 1 |
|---|---|---|---|---|---|---|
| Thick cord | N | Y | Y | Y | Y | Y |
| Number of plies | 2 | 2 | 1 | 1 | 1 | 1 |
| Insulation | N | N | N | Y | Y | Y |
| ta/td [—] | — | — | — | 0.1 | 0.2 | 0.4 |
| Lb [mm] | — | — | — | 50 | 50 | 50 |
| Hc/HS [—] | — | — | — | 0.17 | 0.17 | 0.17 |
| E*r/E*t [—] | — | — | — | 1.0 | 1.0 | 1.0 |
| Mass | 100 | 50 | 150 | 170 | 160 | 150 |
| Appearance quality | 100 | 30 | 10 | 10 | 80 | 100 |
| Pinch cut resistance | 100 | 200 | 100 | 100 | 100 | 100 |
| Durability | 100 | 100 | 100 | 100 | 100 | 100 |
| RRC | 100 | 80 | 120 | 110 | 110 | 110 |
| Combined | 500 | 460 | 480 | 490 | 550 | 560 |

TABLE 2

|  | Ex. 3 | Comp. Ex. 5 | Ex. 4 | Ex. 5 | Ex. 6 |
|---|---|---|---|---|---|
| Thick cord | Y | Y | Y | Y | Y |
| Number of plies | 1 | 1 | 1 | 1 | 1 |
| Insulation | Y | Y | Y | Y | Y |
| ta/td [-] | 0.6 | 0.7 | 0.4 | 0.4 | 0.4 |
| Lb [mm] | 50 | 50 | 30 | 30 | 30 |
| Hc/HS [-] | 0.17 | 0.17 | 0.17 | 0.26 | 0.26 |
| E*r/E*t [-] | 1.0 | 1.0 | 1.0 | 1.0 | 1.5 |
| Mass | 140 | 90 | 180 | 200 | 200 |
| Appearance quality | 100 | 100 | 100 | 100 | 150 |
| Pinch cut resistance | 100 | 100 | 100 | 100 | 100 |
| Durability | 100 | 100 | 100 | 100 | 100 |
| RRC | 110 | 90 | 120 | 150 | 150 |
| Combined | 550 | 480 | 600 | 650 | 700 |

As shown in Tables 1 and 2, it is confirmed that, in each Example, mass reduction can be achieved while suppressing a decrease in the strength of the carcass without impairing appearance quality.

The above-described technology for mass reduction can also be applied to various tires.

Preferably, in the tire, the inner liner includes an inner layer forming a tire inner surface, and an outer layer stacked outward of the inner layer. The inner layer is a crosslinked product of a rubber composition containing a butyl-based rubber. The outer layer is a crosslinked product of a rubber composition containing natural rubber. A ratio of a complex elastic modulus of the insulation to a complex elastic modulus of the outer layer is not less than 1.0 and not greater than 2.0.

Preferably, in the tire, an end of the insulation is located radially outward of an outer end of the apex. A ratio of a distance in the radial direction from the end of the insulation to the outer end of the apex to a tire cross-sectional height is not less than 0.15 and not greater than 0.35.

Preferably, in the tire, an end of each of the turned-up portions is located radially inward of the end of the insulation. A ratio of a distance in the radial direction from the end of the insulation to the end of the turned-up portion to the distance in the radial direction from the end of the insulation to the outer end of the apex is not less than 1.2 and not greater than 2.0.

Preferably, in the tire, the insulation includes a pair of rubber layers arranged so as to be spaced apart from each other in an axial direction with an equator plane therebetween. An outer end of each of the rubber layers is located axially inward of an end of the belt. A distance in the axial direction from the outer end of the rubber layer to the end of the belt is not less than 10 mm and not greater than 50 mm.

Preferably, in the tire, a ratio of a distance between the carcass cords in the carcass ply to an outer diameter of the carcass cord is not less than 0.15 and not greater than 0.45.

Preferably, in the tire, a large number of dimples are provided on a tire outer surface so as to be aligned in a circumferential direction. A shortest distance from each dimple to the end of the turned-up portion is not less than 2 mm and not greater than 10 mm.

Preferably, an outer diameter of each of the carcass cords is not less than 0.85 mm and not greater than 1.05 mm, and a thickness of the carcass ply is not less than 1.1 mm and not greater than 1.4 mm.

Preferably, all of the carcass cords have a same outer diameter.

Preferably, an end of each of the turned-up portions is spaced apart from an outer end of a corresponding one of the apexes of the pair of beads.

Preferably, the end of the turned-up portion is radially inward of the corresponding apex.

Preferably, the end of the turned-up portion is radially outward of the corresponding apex.

Preferably, each of the beads includes a second apex located radially outward of the core.

According to the present disclosure, a tire that can achieve mass reduction while suppressing a decrease in the strength of a carcass without impairing appearance quality is obtained.

What is claimed is:

1. A tire comprising:
   a tread configured to come into contact with a road surface;
   a pair of sidewalls each connected to an end of the tread and located radially inward of the tread;
   a pair of beads each located radially inward of the sidewall;
   a carcass located inward of the tread and the pair of sidewalls and extending on and between a first bead and a second bead out of the pair of beads;
   a belt located between the tread and the carcass in a radial direction;
   an inner liner located inward of the carcass; and
   an insulation located between the carcass and the inner liner, wherein
   each of the beads includes a core and an apex located radially outward of the core,
   the carcass includes only one carcass ply, the carcass ply includes a ply body extending between the core of the first bead and the core of the second bead, and a pair of turned-up portions connected to the ply body and turned up at the cores of the first and second beads,
   the carcass ply includes a plurality of carcass cords aligned with each other and a topping rubber covering the carcass cords, each of the carcass cords being an organic fiber cord formed of only one or more organic fibers,
   each of the carcass cords has a total fineness of not less than 6000 dtex and not greater than 9000 dtex,
   the insulation is located between the first bead and the second bead,
   a ratio of a thickness of a portion of the topping rubber located between the insulation and the carcass cords to a thickness of the insulation is not less than 0.2 and not greater than 0.6,
   a thickness of the carcass ply is not less than 1.1 mm and not greater than 1.4 mm,
   the inner liner includes an inner layer forming a tire inner surface, and an outer layer stacked outward of the inner layer,
   the inner layer is a crosslinked product of a rubber composition containing a butyl-based rubber,
   the outer layer is a crosslinked product of a rubber composition containing natural rubber, and
   a ratio of a complex elastic modulus of the insulation to a complex elastic modulus of the outer layer is not less than 1.0 and not greater than 2.0.

2. The tire according to claim 1, wherein
   an end of the insulation is located radially outward of an outer end of the apex, and
   a ratio of a first distance in the radial direction from the end of the insulation to the outer end of the apex to a tire cross-sectional height is not less than 0.15 and not greater than 0.35.

3. The tire according to claim 2, wherein
   an end of each of the turned-up portions is located radially inward of the end of the insulation, and
   a ratio of a second distance in the radial direction from the end of the insulation to the end of the turned-up portion to the distance in the radial direction from the end of the insulation to the outer end of the apex is not less than 1.2 and not greater than 2.0.

4. The tire according to claim 1, wherein
   the insulation includes a pair of rubber layers arranged so as to be spaced apart from each other in an axial direction with an equator plane therebetween,
   an outer end of each of the rubber layers is located axially inward of an end of the belt, and
   a distance in the axial direction from the outer end of the rubber layer to the end of the belt is not less than 10 mm and not greater than 50 mm.

5. The tire according to claim 1, wherein
   a ratio of a distance between the carcass cords in the carcass ply to an outer diameter of the carcass cord is not less than 0.15 and not greater than 0.45.

6. The tire according to claim 1, wherein
   a plurality of dimples are provided on a tire outer surface so as to be aligned in a circumferential direction, and
   a shortest distance from each dimple to an end of the turned-up portion is not less than 2 mm and not greater than 10 mm.

7. The tire according to claim 1, wherein
   an outer diameter of each of the carcass cords is not less than 0.85 mm and not greater than 1.05 mm.

8. The tire according to claim 1, wherein
   all of the carcass cords have a same outer diameter.

9. The tire according to claim 1, wherein
   an end of each of the turned-up portions is spaced apart from an outer end of a. corresponding one of the apexes of the pair of beads.

10. The tire according to claim 9, wherein
    the end of the turned-up portion is radially inward of the corresponding apex.

11. The tire according to claim 9, wherein
    the end of the turned-up portion is radially outward of the corresponding apex.

12. The tire according to claim 9, wherein
    each of the beads includes a second apex located radially outward of the core.

* * * * *